(12) United States Patent
Lebioda et al.

(10) Patent No.: US 12,278,593 B2
(45) Date of Patent: *Apr. 15, 2025

(54) THREE-DIMENSIONAL SOLAR ELECTRICAL GENERATION SYSTEMS AND METHODS OF DEPLOYMENT

(71) Applicant: Stella Power Inc., Calgary (CA)

(72) Inventors: Kenneth Eugene Lebioda, Calgary (CA); John Charles Goetz, Canmore (CA); Christian Bennett Lebioda, Calgary (CA); Nolan Kenneth Lebioda, Calgary (CA); Christopher Ross Armstrong Halliday, Calgary (CA)

(73) Assignee: Stella Power Inc., Calgary (CA)

( * ) Notice: Subject to any disclaimer, the term of this patent is extended or adjusted under 35 U.S.C. 154(b) by 2 days.

This patent is subject to a terminal disclaimer.

(21) Appl. No.: 17/631,225

(22) PCT Filed: Jun. 15, 2021

(86) PCT No.: PCT/CA2021/050817
§ 371 (c)(1),
(2) Date: Jan. 28, 2022

(87) PCT Pub. No.: WO2021/253118
PCT Pub. Date: Dec. 23, 2021

(65) Prior Publication Data
US 2022/0278644 A1 Sep. 1, 2022

Related U.S. Application Data

(60) Provisional application No. 63/039,775, filed on Jun. 16, 2020.

(51) Int. Cl.
*H02S 30/10* (2014.01)
*H02S 20/10* (2014.01)
*H02S 40/22* (2014.01)

(52) U.S. Cl.
CPC .............. *H02S 30/10* (2014.12); *H02S 20/10* (2014.12); *H02S 40/22* (2014.12)

(58) Field of Classification Search
CPC ........... H02S 30/10; H02S 20/10; H02S 40/22
See application file for complete search history.

(56) References Cited

U.S. PATENT DOCUMENTS

| 3,736,976 A | 6/1973 | Palmer |
| 8,178,775 B2 | 5/2012 | Taylor et al. |

(Continued)

FOREIGN PATENT DOCUMENTS

| CN | 105915169 A | 8/2016 |
| CN | 108521264 A | 9/2018 |

(Continued)

OTHER PUBLICATIONS

English Translation of Stäber, WO-2021089679 (Year: 2021).*
(Continued)

*Primary Examiner* — Jayne L Mershon
(74) *Attorney, Agent, or Firm* — Farber LLC

(57) ABSTRACT

Three-dimensional solar power generation systems are described. The systems are characterized by a plurality of solar panels configured to include pole and equator facing panels and, in various embodiments additional top and/or side panels that form a segmented and dome-shaped assembly. The systems have improved efficiencies particularly with respect to early morning and evening power generation that enable improved power densities on a given land area as compared to traditional solar panel arrays. Methods of deploying the systems are also described.

19 Claims, 26 Drawing Sheets

(56) References Cited

U.S. PATENT DOCUMENTS

| | | |
|---|---|---|
| D664,916 S | 8/2012 | Conger |
| 8,371,076 B2 | 2/2013 | Jones |
| 8,940,997 B2 | 1/2015 | Conger |
| 9,548,696 B2 | 1/2017 | Atchley et al. |
| 9,568,218 B2 | 2/2017 | Hollabaugh |
| 9,612,039 B2 | 4/2017 | Meppelink |
| 9,780,719 B2 | 10/2017 | Atchley et al. |
| 9,790,065 B2 | 10/2017 | Jordan |
| 9,985,154 B2 | 5/2018 | Needham |
| 10,116,252 B2 | 10/2018 | Drwal |
| 10,355,636 B2 | 7/2019 | Danning |
| 10,998,461 B2 | 5/2021 | Needham |
| 2007/0151594 A1 | 7/2007 | Mascolo |
| 2010/0043781 A1 | 2/2010 | Jones et al. |
| 2011/0067748 A1 | 3/2011 | Pfeiffer |
| 2011/0083718 A1 | 4/2011 | Wichner |
| 2011/0180125 A1 | 7/2011 | Wichner |
| 2011/0203636 A1 | 8/2011 | Wichner |
| 2012/0007434 A1 | 1/2012 | Perreault et al. |
| 2012/0138120 A1 | 6/2012 | Fernandez |
| 2014/0014161 A1 | 1/2014 | Kim et al. |
| 2014/0116495 A1 | 5/2014 | Kim et al. |
| 2014/0238483 A1 | 8/2014 | Rampley et al. |
| 2015/0331972 A1* | 11/2015 | McClure ............... G06F 17/11 703/2 |
| 2017/0257059 A1 | 9/2017 | Kutzer |
| 2018/0226917 A1 | 8/2018 | Jacques |
| 2019/0190443 A1 | 6/2019 | Kutzer |
| 2019/0296685 A1 | 9/2019 | Abraham |
| 2019/0372508 A1 | 12/2019 | Saavedra |
| 2019/0372509 A1* | 12/2019 | Saavedra ............... H02S 20/30 |
| 2020/0228057 A1 | 7/2020 | Roberts et al. |
| 2020/0274479 A1 | 8/2020 | Tehan et al. |
| 2020/0358392 A1 | 11/2020 | Kiefer, III et al. |
| 2021/0006197 A1 | 1/2021 | Saavedra |
| 2021/0006198 A1 | 1/2021 | Saavedra |
| 2021/0075365 A1 | 3/2021 | Clapp et al. |
| 2021/0126578 A1 | 4/2021 | Urrutia |
| 2021/0152119 A1 | 5/2021 | Mackler |
| 2021/0202767 A1 | 7/2021 | Needham |
| 2021/0328543 A1 | 10/2021 | Wentzel |
| 2021/0344298 A1 | 11/2021 | Saavedra |
| 2022/0015306 A1 | 1/2022 | Headley |
| 2022/0021327 A1 | 1/2022 | Headley |
| 2022/0021332 A1 | 1/2022 | Krause et al. |
| 2022/0190773 A1 | 6/2022 | Selten et al. |

FOREIGN PATENT DOCUMENTS

| | | | |
|---|---|---|---|
| EP | 2834576 A2 | 2/2015 | |
| EP | 3026366 | 12/2018 | |
| JP | 10210777 A | 8/1999 | |
| JP | 2004014887 A | 1/2004 | |
| JP | 2005005296 A | 1/2005 | |
| JP | 2007270616 | 10/2007 | |
| JP | 2014154743 A | 8/2014 | |
| JP | 3196260 U | 2/2015 | |
| JP | 2015124537 A | 7/2015 | |
| JP | 2019068651 A | 4/2019 | |
| JP | 2020112765 A | 7/2020 | |
| WO | 2012172296 A1 | 12/2012 | |
| WO | 2018024948 A1 | 2/2018 | |
| WO | 2020214023 A1 | 10/2020 | |
| WO | 2020214024 A1 | 10/2020 | |
| WO | WO-2021089679 A1 * | 5/2021 | ............ H02S 20/10 |
| WO | 2021130755 A1 | 7/2021 | |

OTHER PUBLICATIONS

Sim et al., Fractal solar cell array for enhanced energy production: applying rules underlying tree shape to photovoltaics.

Sullivan, Ralph M., Shadow Effects on a Series-Parallel Array of Solar Cells.

Yun et al., Leaf Anatomy and 3-D Structure Mimic to Solar Cells with Light Trapping and 3-D Arrayed Submodule for Enhanced Electricity Production.

* cited by examiner

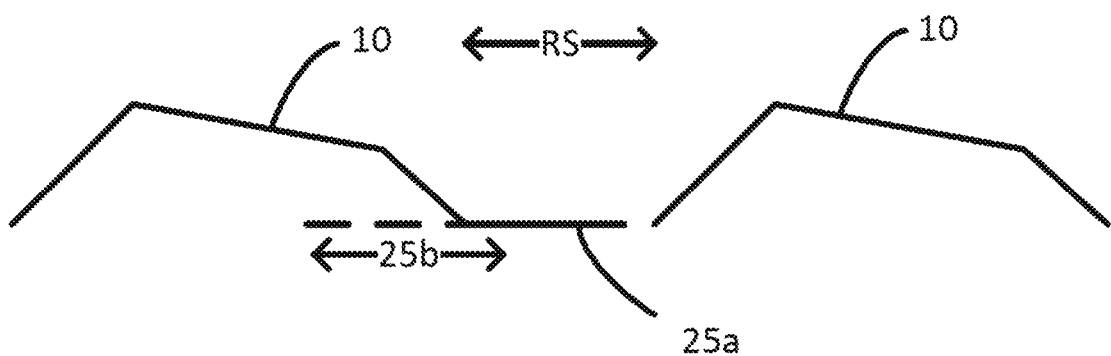
FIGURE 5A (1)
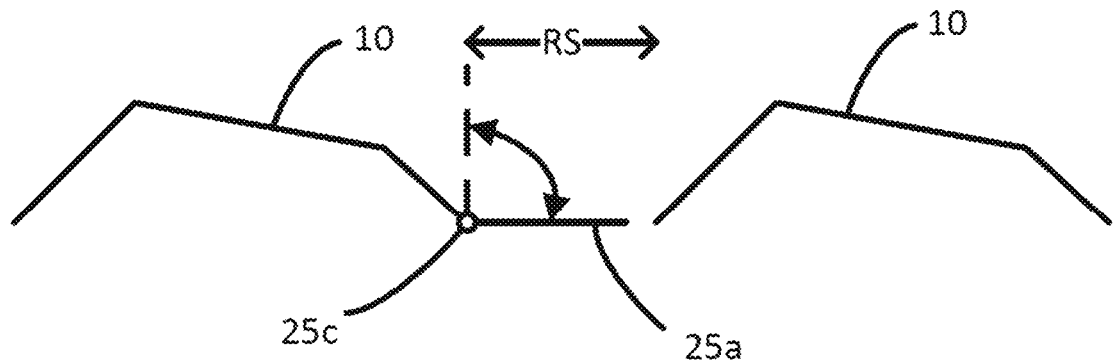
FIGURE 5A (2)

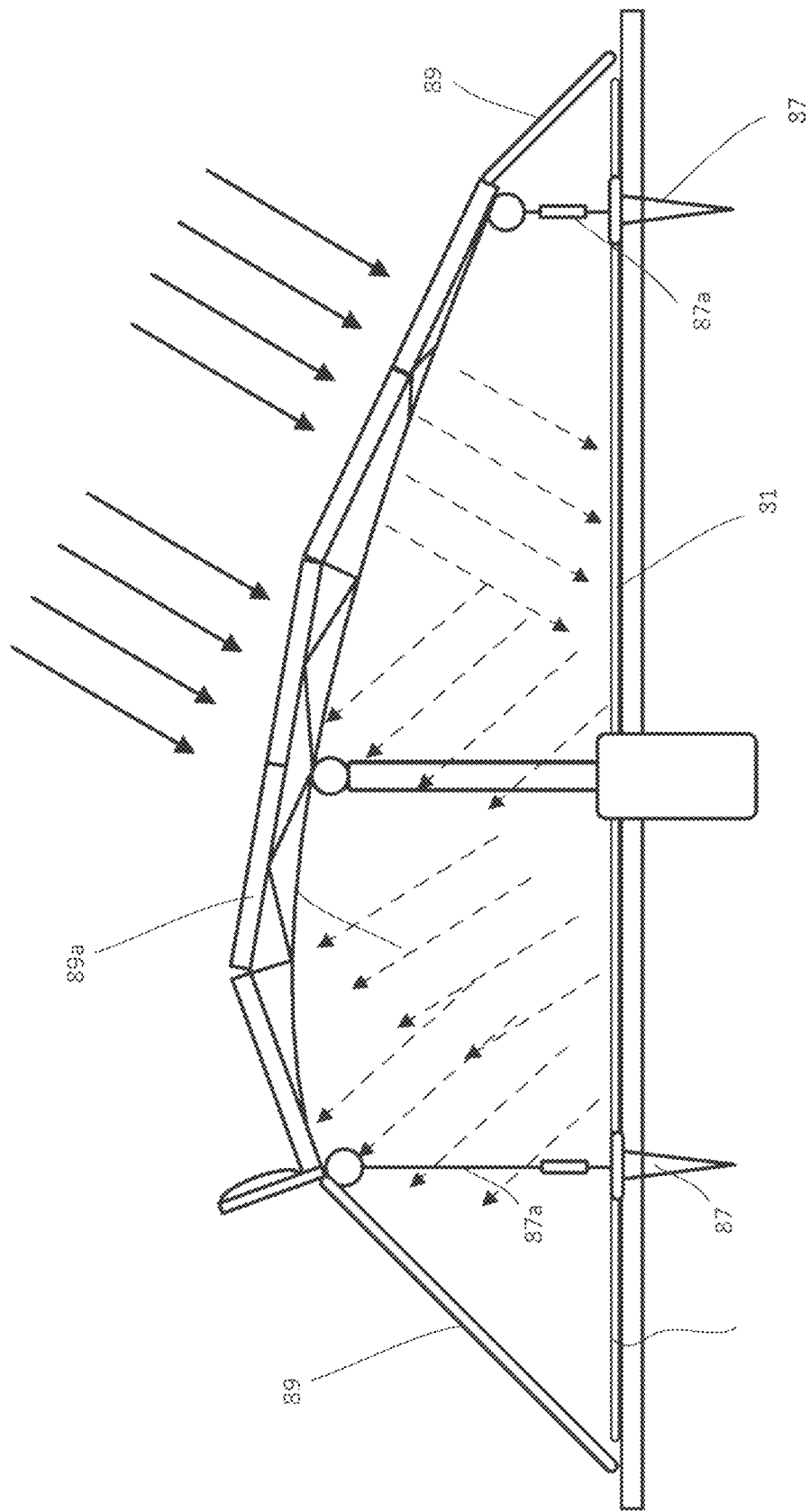
FIGURE 7A(1)

THREE-DIMENSIONAL SOLAR ELECTRICAL GENERATION SYSTEMS AND METHODS OF DEPLOYMENT

FIELD OF THE INVENTION

Three-dimensional solar power generation systems are described. The systems are characterized by a plurality of solar panels configured to include pole and equator facing panels and, in various embodiments additional top and/or side panels that form a single and multiple angled low-profile segmented and dome-shaped assembly. The systems have improved efficiencies particularly with respect to early morning and evening power generation that enable improved power densities on a given land area as compared to traditional solar panel arrays. The systems also provide improved wind-loading characteristics and enable simplified racking and anchoring while allowing operations and maintenance access. Methods of deploying the systems are also described.

BACKGROUND OF THE INVENTION

The pursuit of renewable energy, specifically in solar power applications, continues to grow rapidly in its scope and application globally. The use of photovoltaic (PV) cells to convert the radiant energy of sunlight into electrical energy has promulgated in development and scope over the past several decades. However, to date, the majority of photovoltaic cell systems are arranged with conventional approaches and largely designed for permanent equator facing systems. Typical installations include horizontal mounting on residential roofs and building structures or in larger land-based solar array projects where arrays of solar panels are deployed in fields.

For the purposes of description herein, reference may be made to the directions of "north" and "south" and "pole-facing" and "equator-facing" panels. Generally, north refers to a direction towards the north pole and south refers to a direction towards the south pole. The term pole-facing refers to a direction that is towards either the north pole or the south pole and the term equator-facing refers to a direction towards the equator. In the context of PV systems located in the northern hemisphere, pole-facing refers to a direction towards the north pole and for PV systems located in the southern hemisphere, pole-facing refers to a direction towards the south pole. Equator-facing always refers to a direction generally towards the equator.

Although solar cell and panel technologies have adopted different approaches to improve efficiency over the past few decades (Chen et al 2013) (Serban et al 2012), and while the cost of solar energy is now competitive with other non-renewable approaches (Lazard 2017), there continues to be a need for improvements. In particular, there has been a need for improvements in efficiency of overall power output, balance of system cost inputs, and ease of servicing in residential, industrial and land-array applications. Novel approaches that improve key factors in the collection of solar power such as reduced installation and maintenance costs, protection from environmental forces such as wind damage are needed to make this type of sustainable power even more competitive in the growing global need for renewable and sustainable power sources.

One key area for improvement with legacy solar array applications is inefficient land use required for power generation (NREL Report, Heath et al 2013). As is known, large solar array applications require large land footprints as well as labor intensive assembly installation and servicing processes. Additional issues with these types of applications in residential and/or industrial rooftop installations include potential damage to structures over extended periods of time due to added loads both from weight and wind-loading forces. Importantly, whether a solar array is designed for a field/ground installation or a building installation, each installation will require significant engineering to design appropriate support structures for a specific installation. While standard support frames may be adaptable to different solar arrays and may permit a degree of flexibility to allow installation in a variety of different land/building locations, a degree of customization will likely be required for almost all installations due to particular features or characteristics of a specific location. For example, a field installation will require foundation structures specific to the field location where the depth/size of the foundation will require consideration to such factors as the slope of the ground, the soil/ground characteristics, wind loading on the arrays, as well as other considerations such as annual ground frost depth. Similarly, a building installation will also require consideration to the particulars of attaching a large and heavy array to a roof structure, the underlying support within the building as well as wind loading.

As is known, the majority of traditional solar panel systems have solar cell panels that are placed next to each other in an angled configuration usually in a fixed or single axis scenario facing the equator. Generally, the orientation of the panels and the spacing between panels will take into consideration the latitude of the installation and how the output from the entire installation can be optimized having consideration to the time-of-day and time-of year. For example, in a fixed panel array, a designer wishing to install an array at 45 degrees latitude, as a general and approximate rule will choose to orient the panels at roughly 45 degrees to the horizon (in practice generally a few degrees less). This fixed orientation will generally and on average over the course of a solar year provide the most efficient orientation to maximize output insomuch as this angle will orient the panels as close to 90 degrees relative to the sun angle over the year. That is, while the sun's angle relative to the panel will be constantly changing throughout the day and year, the approximate 45-degree angle represents the orientation that will provide the minimum variation in power output over the course of a day and year. While a fixed orientation may provide a first level of minimizing variations in solar array output, there will be significant differences in output over the course of the day and time of year. That is, throughout the course of a day from sunrise to sunset, output will increase from zero at sunrise (or later) to a peak at roughly noon and then drop down to zero at sunset (or earlier). Similarly, the output will vary throughout the year due to the length of the day and the angle of the sun relative to the horizon over the course of the solar year.

As such, designers and solar array developers may choose to incorporate tracking systems that better orient the panels over the day and year. However, as can be appreciated, tracking systems whether they are single or double axis, have a number of drawbacks including increased up-front costs, extra-weight, use of power to operate, increased engineering and installation costs due to different structural support and wind-loading considerations, increased maintenance costs and increased operational costs including tracking software.

Importantly, while tracking systems can improve overall output significantly of a single panel, those gains may be offset by requiring additional inter row spacings between adjacent panels to accommodate the effect of shadows from one panel onto other panels in an array. That is, to the extent that the orientation and/or angle of panels is being changed throughout the day and year, the shadows being cast from one panel to another will have an affect on output of the entire array. Generally, increasing spacing between panels may improve collective output from multiple panels but may then require significantly more land to accommodate the overall array. At certain times of the day and year, shadow effects may be low for the entire array but generally the lower the sun is to the horizon, shadow effects will be very significant near sunrise, sunset and throughout winter months. In other words, spacing characteristics that are dependent on the shadow cast by the height of the horizontal rows impacts the density of such panels within a limited land footprint and, as such, limit the potential power output of the land footprint (Sun et al 2014).

Further still, as is known, peak power demands in many communities are generally early morning as people wake up and get ready for their day and early evening when people return home. This peak power is also further increased during summer months in many regions of the world due to longer daylight hours and increased use of air conditioning. (Stan Cox et al 2012 https://e360.yale.edu/feature)

Unfortunately, for the reasons as outlined above, the peak output from a solar array in a given location does not correspond to these times (assuming other factors such as cloud cover is consistent throughout the day).

From the foregoing, it can be seen that optimizing solar panel/array output for a given installation (e.g. ground or building) whilst taking into account the varied factors that contribute to the ultimate output of a solar panel array both throughout the day and year is a complex problem requiring a wide range of compromises to achieve a desired level of performance and/or cost.

Accordingly, there has been a need for solar panel systems that improve the solar panel density for a given area while providing improved power density as well as other system efficiencies. As described below, three-dimensional panel systems are described. These systems are referred to herein as Maximized Energy Reference (MER) system which is also derived from the ancient Egyptian word for pyramid, the symbol of power, strength and durability.

SUMMARY OF THE INVENTION

In accordance with the invention, improved solar cells systems and arrays are described.

In a first aspect, a three-dimensional solar panel assembly is described comprising: a plurality of solar panels including; at least one square or rectangular equator facing panel (EFP); at least one square or rectangular pole facing panel (PFP) operatively connected to the EFP; at least two triangular or trapezoidal side panels (SPs) each connected to a side edge of an EFP or PFP, wherein each of the EFP, PFP and SPs are connected together to form a segmented and dome-shaped assembly.

In various embodiments:
The solar panel assembly includes at least one square or rectangular top panel (TP) connected to a top edge of each of the EFP and PFP.
The PFP is angled with respect to the EFP at an angle $\lambda$ wherein $\lambda$ is 105-135 degrees.
The TP is at an angle $\varepsilon$ to the horizontal and wherein $\varepsilon$ is 0-20 degrees.

The SPs include a trapezoidal side panel having a side edge connected to a TP, a first triangular SP having a side edge connected to a PFP and a second triangular SP having a side edge connected to an EFP.
The SPs, EFPs, TPs and PFPs have a common base plane along bottom edges of each panel.
Each EFP includes two or more square or rectangular solar panels connected together along an edge.
Each TP includes two or more square or rectangular solar panels connected together along an edge.
Each PFP includes two or more square or rectangular solar panels connected together along an edge.
Multiple PFPs, EFPs and TPs are interconnected to form an elongated dome structure.
The solar panel assembly includes a support frame having a plurality of side frame members configured to support side edges of each PFP, TP and EFP.
The support frame further includes at least one transverse member for connecting the side frame members together.
The solar panel assembly includes at least one transverse member includes a central transverse support member configured to support a central balance point of the solar panel assembly.
The solar panel assembly includes a plurality of central support members for supporting the central transverse support member above a ground surface.
The central transverse support member is pivotable with respect to the central support members.
The at least one transverse member includes a PFP transverse member configured to connect side frame members together adjacent a lower edge of each PFP.
The at least one transverse member includes an EFP transverse member configured to connect side frame members together adjacent a lower edge of each EFP.
The solar panel assembly includes a plurality of ground screws and tension members connected to the solar panel assembly along a lower edge of the EFP and PFP for securing the solar panel assembly to the ground.
The solar panel assembly includes at least one wind deflection panel configured to a lower edge of the PFP and having a length to extend to a ground surface.
The at least one wind deflection panel is a solar panel.
The frame members includes: at least two PFP members for supporting side edges of each PFP; at least two TP members for supporting side edges of each TP; and, at least two EFP members for supporting side edges of each EFP.
At least one solar panel is a bi-facial solar panel.
The solar panel assembly includes a reflective surface operatively positioned under the solar panels to reflect light to a ground-facing surface of the solar panels.

In another aspect, a three-dimensional solar panel assembly is described comprising: a plurality of solar panels having an assembled height h, the assembly including at least one equator facing panel (EFP), at least one top panel (TP) and at least one pole facing panel (PFP), the EFP, TP and PFP connected together wherein the PFP is angled with respect to the horizontal at an angle $\beta$; the EFP is angled with respect to the horizontal at an angle $\theta$; the TP is angled with respect to the horizontal at an angle $\varepsilon$; the TP interconnects the EFP and PFP; and the PFP and EFP each have respective lengths to support the TP at the angle $\varepsilon$.

In various embodiments:
$\varepsilon$ is 0-20°.
h is 1-3 feet.
$\theta$ is 10-45°.

θ is 10-30°.

β is 10-45°.

β is 30-45°.

The EFP, PFP and TP define 4 outer edges and the assembly further comprises at least two trapezoidal side panels (SPs) having a long base edge and a short top edge, and wherein the short top edge of each trapezoidal panel is connected to and supports an outer edge of the TP and where each SP extends outwardly at an outward angle from the top panel to form a generally truncated pyramid, the outward angle being proportional to a latitude of deployment.

The solar panel assembly has a width W defined as a cross-sectional and transverse width through the PFP and EFP and a length L perpendicular to W and wherein L is 1-20 times W.

h is proportional to a latitude of deployment and h is proportionally higher at lower latitudes.

In another aspect, an array of solar panel assemblies deployed on an area of land is described, the array comprising a plurality of solar panel assemblies as described herein wherein each solar panel assembly is deployed each having respective EFPs facing the equator and wherein the array has at least two rows of solar panel assemblies deployed with a spacing S defining a space row between each row and wherein h of each solar panel assembly and S are configured to: minimize shadow effects from one row to another; maximize power output from the array across time of day; and maintain a minimum spacing between rows to enable worker movement.

In various embodiments:

The array includes an inter-row solar panel (IRSP) for deployment within the space row and wherein each IRSP is configured to enable selective movement of the IRSP between a deployed and exposed position and an un-deployed position allowing worker movement between rows.

The IRSP is pivotally attached to a solar panel assembly.

The IRSP is configured to a solar panel assembly with a drawer system.

Each solar panel assembly comprises: a PFP, EFP and TP, each assembled from a panel of solar cells wherein the PFP and EFP are substantively equal in area and the TP is substantively twice the area of a PFP or EFP; and where a plurality of solar panel assemblies is configured in a generally east-west orientation across an area of land to define a row of solar panel assemblies.

The spacing S is 3-4 feet.

Each solar panel assembly incudes four trapezoidal side panels and where each trapezoidal side panel has two side edges operatively connected to a corresponding side edge of an adjacent side panel.

The plurality of solar panels is constructed with a height range from top to bottom of a PFP of 18 to 28 inches and are deployed between 45-60 degrees latitude.

The plurality of solar panels has a height range from top to bottom of PFPs of 24 to 36 inches and are deployed between 0-45 degrees latitude.

The assembly includes an integrated folding reflective panel that directs irradiant energy back to a pole-facing panel.

BRIEF DESCRIPTION OF THE DRAWINGS

The invention is described with reference to the drawings in which:

FIGS. 5A(1) and 5A(2) are each a schematic side view of a pair of MERs in adjacent rows having an inter-row solar panel (IRSP) therebetween in accordance with various embodiments of the invention.

FIG. 7A(1) is a schematic side view of an elevated MER with bi-facial solar panels in accordance with one embodiment of the invention.

DETAILED DESCRIPTION OF THE INVENTION

Example embodiments are described herein in the context of a three-dimensional low profile solar electrical generator system. The same reference indicators will be used to the extent possible throughout the drawings and the following description to refer to the same or like items.

In the interest of clarity, not all of the routine features of the implementations described herein are shown and described. It will, of course, be appreciated that in the development of actual system, numerous and iterative implementation-specific decisions may be made in order to achieve optimal land use, shadow characteristics and power output for a developer's specific goals, such as compliance with application- and business-related constraints, and that these specific goals will vary from one implementation site to another and from one developer to another. Moreover, it will be appreciated that such development efforts might be complex and time-consuming but would nevertheless be a routine undertaking of engineering for those of ordinary skill in the art having the benefit of this disclosure.

Overview

As described herein, various embodiments of a low-profile three-dimensional solar electrical generator system are described. Herein, the system is referred to as a Maximized Energy Reference system (MER), wherein each MER has a plurality of angled panels assembled to form a single integrated base solar unit.

Two-Panel MER

Figure 1A:
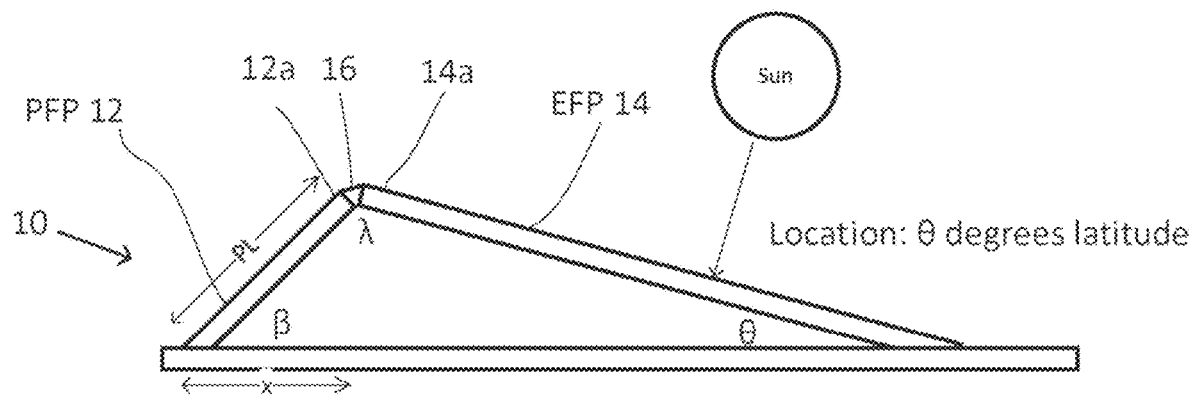
FIGS. 1A, 1B and 1C are a schematic side, end and top view of a 2-panel MER with side panels in accordance with one embodiment of the invention.
Figure 1B:
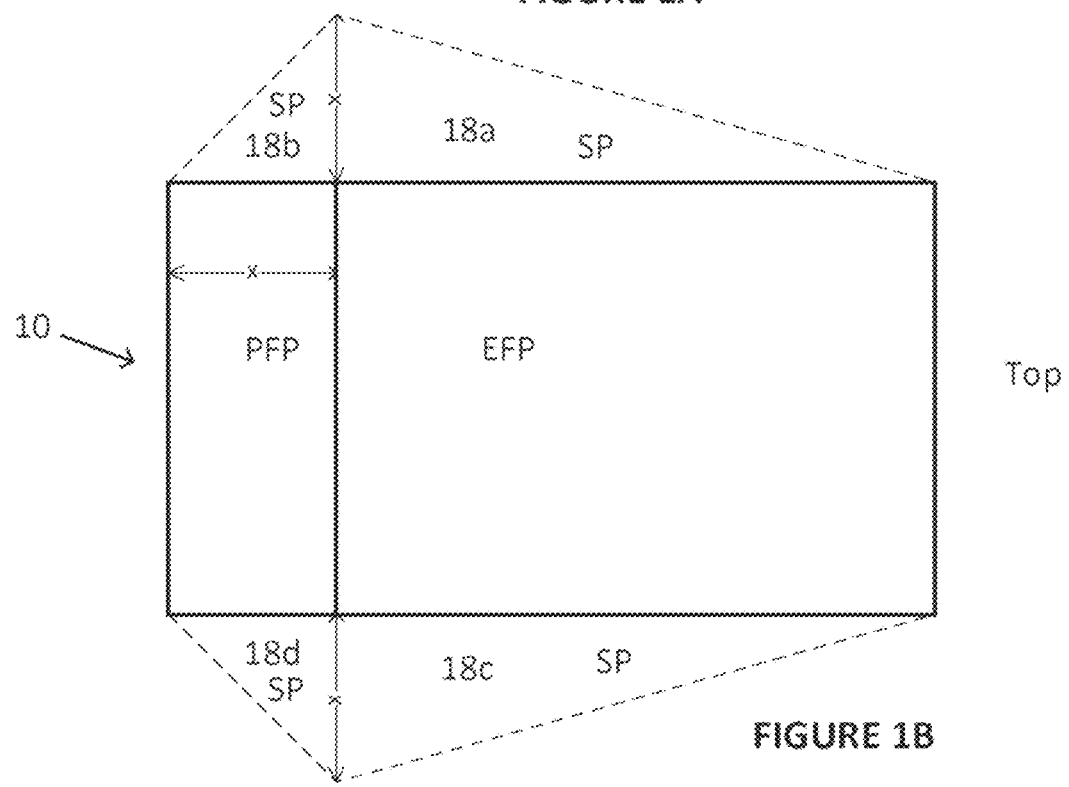

In a first embodiment as shown in FIGS. 1A, 1B and 10, the MER 10 has two panels including a pole-facing panel (PFP) 12 (e.g. North-facing) and an equator-facing panel (EFP) 14 (e.g. South-facing). As shown, the EFP is generally oriented towards the equator and is angled with respect to the horizontal at angle, θ. The angle θ may be selected in order that it roughly corresponds to the latitude of the deployment for deployments at less than 30 degrees latitude. However, for deployments at greater than 30 degrees latitude, the angle θ will typically not exceed 30 degrees.

The MER may include a suitable hinge or fixed connection bracket 16 between the two panels. The PFP provides support to the equator side 14a of the EFP thus elevating the EFP to the correct angle θ for the deployment. The PFP is angled with respect to the horizontal at an angle, β, which will be an acute angle. As shown in Table 1, typical fixed tilt angles are shown for an array across a year at different latitudes using the rules:

a. For latitudes below 25°, tilt angle=latitude×0.87.
 b. For latitudes between 25° and 50° tilt angle=latitude× 0.76+3.1 degrees

TABLE 1

Approximate Tilt Angles for Fixed Angle Arrays

| Latitude | Full year angle | Avg. insolation on panel kWh/m2/day |
|---|---|---|
| 0° (Quito) | 0.0 | 6.5 |
| 5° (Bogotá) | 4.4 | 6.5 |
| 10° (Caracas) | 8.7 | 6.5 |
| 15° (Dakar) | 13.1 | 6.4 |
| 20° (Mérida) | 17.4 | 6.3 |
| 25° (Key West, Taipei) | 22.1 | 6.2 |
| 30° (Houston, Cairo) | 25.9 | 6.1 |
| 35° (Albuquerque, Tokyo) | 29.7 | 6.0 |
| 40° (Denver, Madrid) | 33.5 | 5.7 |
| 45° (Minneapolis, Milano) | 37.3 | 5.4 |
| 50° (Winnipeg, Prague) | 41.1 | 5.1 |

The preferred length, PL of the PFP will be determined by the anticipated latitude of deployment wherein the PL is chosen such that the angle θ generally corresponds to the latitude (typically a few degrees less for latitudes up to about 30 degrees and up to about 30 degrees for latitudes up to about 50 degrees) and the PFP angle β will preferably be less than 45 degrees. As noted, the angle θ will typically not exceed 30 degrees and the angle β will not exceed 45 degrees in order to reduce wind load effects on the PF side of the MER. The connection 16 may be a hinge, enabling adjustment of the angle θ to an optimal angle and may also include leg extensions or other adjustable devices (not shown) to assist in adjustment of the length and angle. The angle λ between the PFP and EFP will be determined by β and θ and will typically be in the range of about 105-135°. As explained below, panels may also be supported by various supporting frames.

FIGS. 1B and 10 show a plan and end view of an embodiment having 4 additional side panels (SPs) 18a-d that extend from the EFP and PFP edges to the ground forming a segmented dome structure. Preferably, each side panel extends from the EFP and PFP outwardly a distance x which preferably is equal for each of the PFP and side panels. Importantly, the side panels provide the ability to capture more early morning/late afternoon light as well as providing structural stability to the MER by providing additional connection between the panels. In addition, the segmented dome structure reduce the wind-loading effects as compared to traditional flat panel systems. In this embodiment, side panels are particularly effective when 6 is approximately 20-30 degrees.

As shown in FIGS. 1B and 10, the SPs are triangular. Generally, the SPs are configured such that the lower edges of all panels define a common lower plane allowing the system to sit flat on a flat ground surface.

Symmetrical MER

Figure 2A:
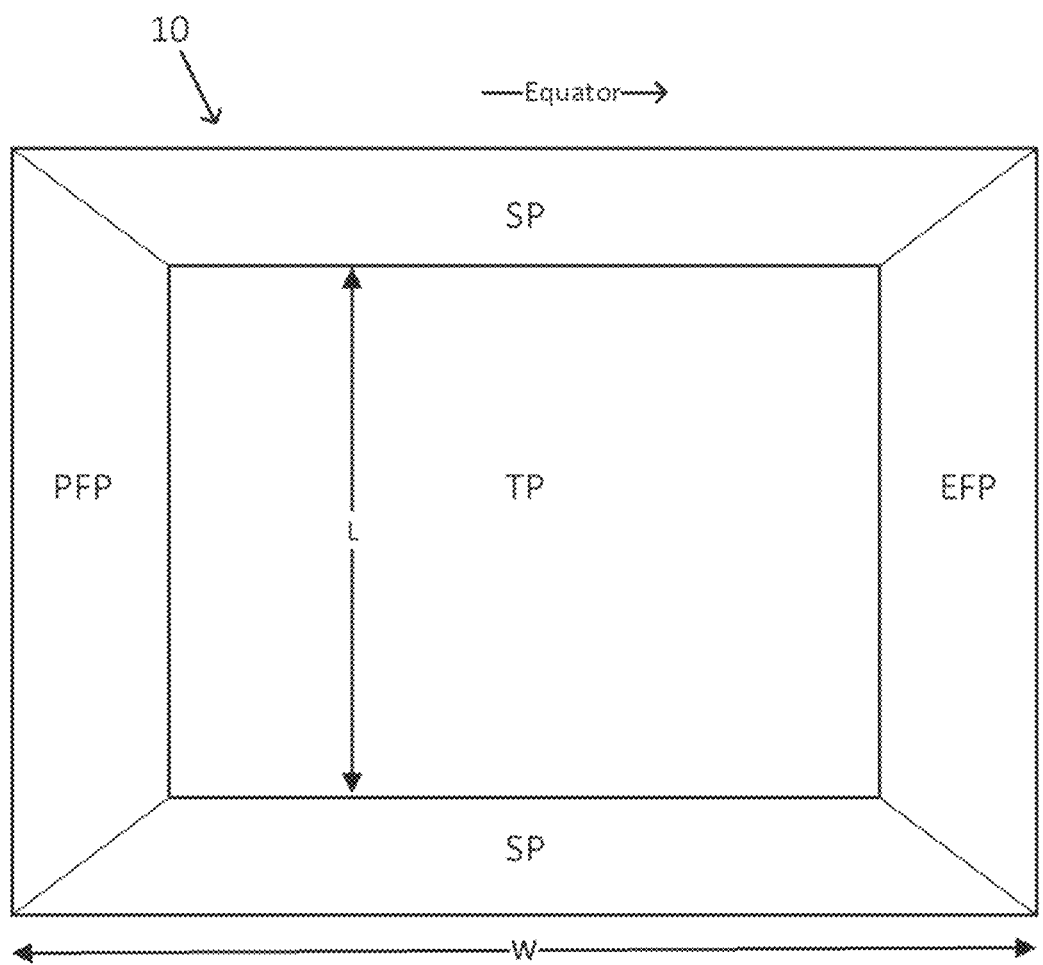
FIGS. 2A and 2B are schematic top and end views of a symmetric MER in accordance with one embodiment of the invention.
Figure 2B:
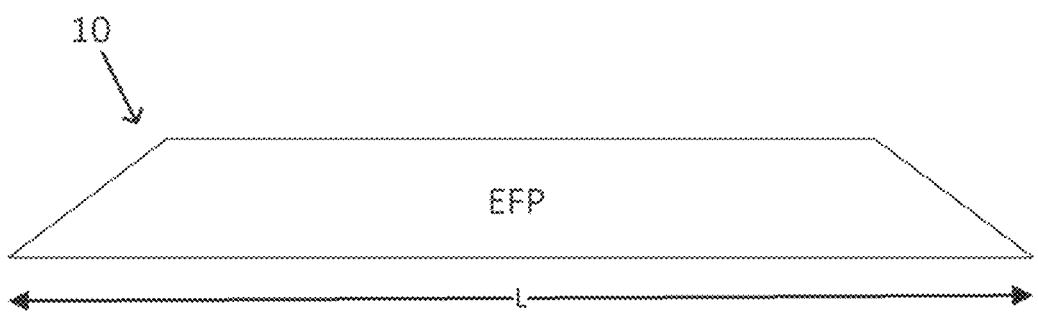

FIGS. 2A and 2B show top and side views of a symmetrical MER. In this embodiment, the MER is comprised of 5 panels including a top panel TP, an equator facing panel EFP and two side panels SPs. In this embodiment, the base profile of the MER is generally square or rectangular and the TP is horizontal (although not essential as explained below). Each of the panels may be comprised of one or more individual solar panels that have been assembled from a plurality of individual solar cells (typically 6 inch by 6 inch solar cells). For example, the top panel may be comprised of multiple rectangular/square panels and the side panels are trapezoidal panels. As standard solar cells are typically square, non-rectangular panels will typically be assembled from standard solar cells in a pattern that minimizes the amount of unused space on a panel. Generally, the SPs will be angled with respect to the horizontal at angles up to about 45 degrees as shown in FIG. 3C.

Asymmetrical MER

Figure 3A:
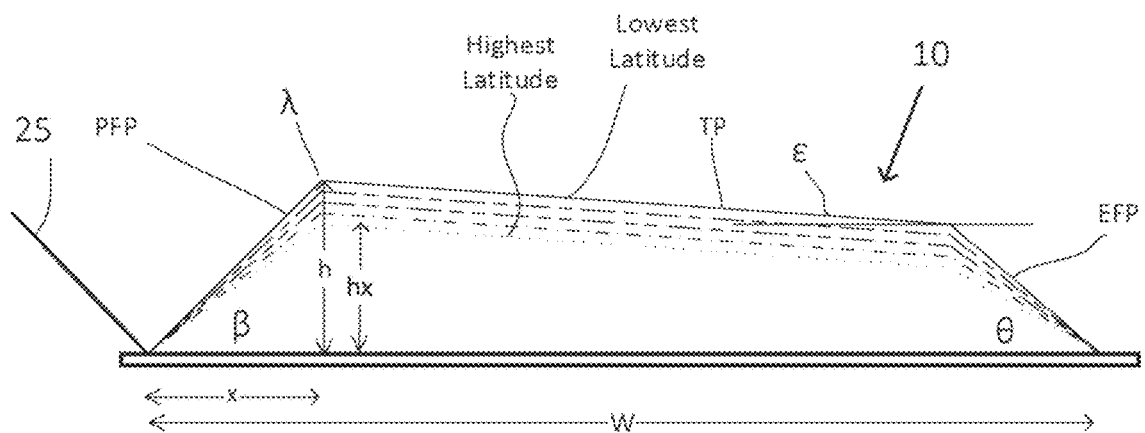
FIGS. 3A, 3B and 3C are schematic side, top and end views of an asymmetric 3-panel MER with side panels in accordance with one embodiment of the invention.
Figure 3B:
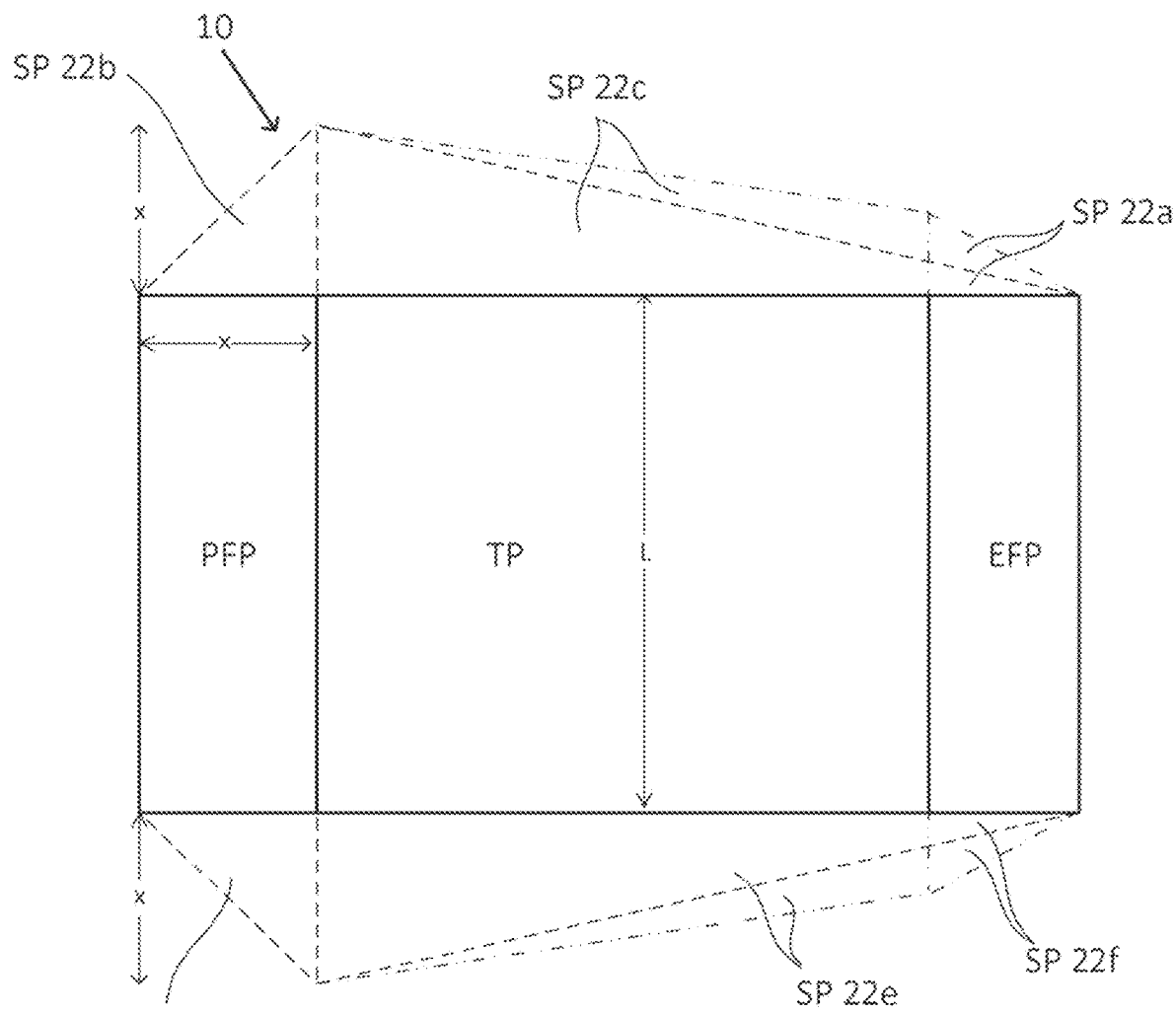
Figure 3C:
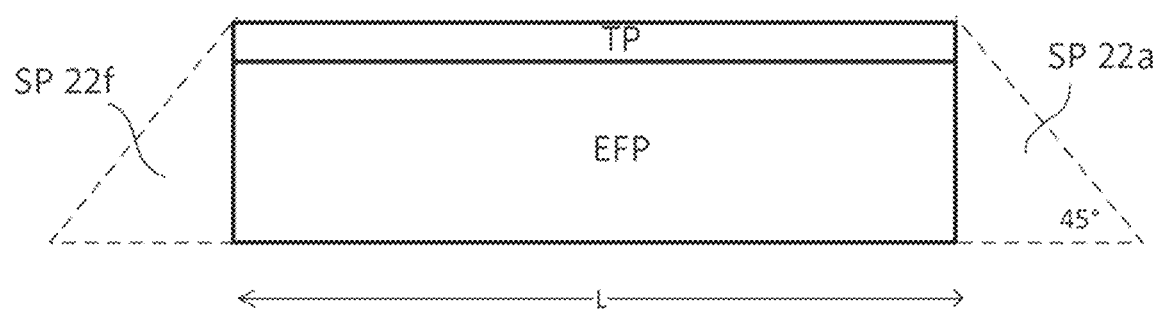

FIGS. 3A, 3B and 3C show a 3-panel embodiment having a PFP, EFP and TP with side panels SPs 22a-f. This embodiment differs from the symmetrical MER embodiments in that the PFP and EFP are different lengths such that the PFP defines an angle β with respect to the horizontal, the PFP and TP define an angle λ with respect to each other, the TP is at an angle ε with respect to the horizontal and the EFP defines an angle θ with respect to the horizontal thus providing for an asymmetric (trapezoidal) structure in cross-section. Generally, as above, it is preferred that the asymmetric MER has side panels SP both to increase the total surface area of solar panels for a given deployment area as well as to increase structural strength and to reduce wind-loading across a MER.

In various embodiments, the dimensions of an asymmetric MER will generally utilize the following design principles:

Lower latitude MERs can be taller as the sun is higher in the sky and shadows cast between adjacent MERs are smaller.

Higher latitude MERs will be lower in height as the sun is lower in the sky and the height reduced to minimize shadows from one MER to another.

Low and high latitude MERs will have a TP sloping towards the equator at an angle sufficient to allow drainage of water. Typically, this angle ε will in the range of about 5-20 degrees.

If the MER includes side panels (preferred), the side panels will have a maximum base length x generally corresponding to the base length x of the PFP.

The height h of a MER will generally correspond to the base length x.

The total width W (typically the cross-sectional width through the EFP, TP and PFP in the pole-equator direction) of a MER will be approximately 3-5x.

The total length L (typically the east-west direction) of a MER will be a multiple of W, typically 0.8-10+W. There is no particular upper limit on L and will be determined by practical features of an installation.

FIG. 3A shows how an asymmetric MER may be designed for different latitudes. As shown, 5 different MER profiles are shown where the lowest latitude MER may have a height h and the highest latitude MER has a lower height $h_x$. As shown, for each design, the TP has a fixed slope towards the equator (to allow water drainage). Thus, as the height is lowered, both the EFP and PFP become shorter. The total height will generally consider overall height relative to an adjacent MER such that the time that shadows are cast during the day from one MER onto another is eliminated or reduced. Practically, the height h will be in the range of 18-36 inches.

Furthermore, as shown in FIG. 3B, the side panels may be various combinations of triangular and trapezoidal panels.

By way of example for deployments at different latitudes, variations in MER profile are described with reference to FIGS. 4A, 4B, 5A and 5B. For example, at 50 degrees latitude in the winter months, the sun height will remain relatively low throughout the day; hence, if multiple MERs are deployed in a two-dimensional array (e.g. m units by n units), depending on spacing MERs in the first row may cast shadows over MERs in the rows behind, thus dramatically affecting their output particularly in the earlier and later times of the day. Thus, overall height is lowered to reduce the time that shadows of one MER interfere with the performance of other MERs. As shown representatively in FIG. 4A, at the winter solstice, the sun will rise at an angle towards the equator. However, at this time, each MER will cast a shadow on adjacent MERs due to the height of each MER. In the case of morning sun, at approximately one hour past sunrise, the sun will be above the horizon and illuminating panels. As shown, the MER closest to the sun will cast a shadow (shown in darkened lines), that depending on the height of each MER and separation to the adjacent MERs may cast a shadow on one or more adjacent MERs. Accordingly, the higher the MER and the closer the spacing will affect this interference. Hence, with a lower MER, the time of the effect of shadow will be reduced allowing a tighter spacing between MERs and thus allow for more panels for a given land area.

Similarly, at the summer solstice, the sun will rise at a direction towards the pole. At this time of the year and during early morning and evening, the PFPs within an array will be able to receive solar power and provide significant power generation capabilities. As shown, for an asymmetric MER, the shadow characteristics in the summer morning will be different. Thus, the invention seeks to provide a design that collectively reduces the time of shadow effects between adjacent MERs particularly during the morning hours (or similarly approaching sunset) throughout the year.

Figure 4A:
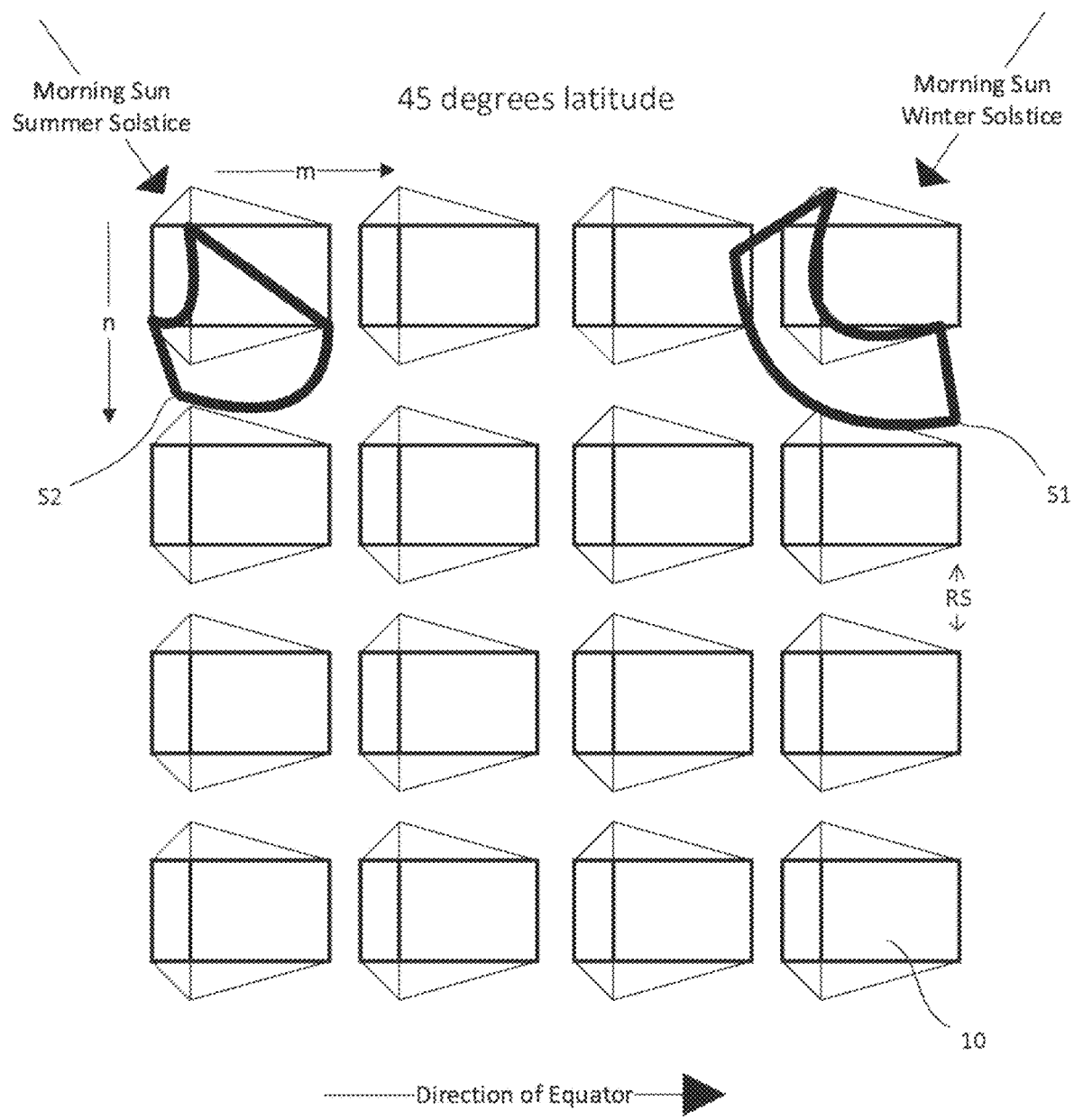
FIG. 4A is a schematic plan view of a MER array comprised of asymmetric MERs showing representative morning shadow characteristics at different times of the year in accordance with one embodiment of the invention.
Figure 4B:
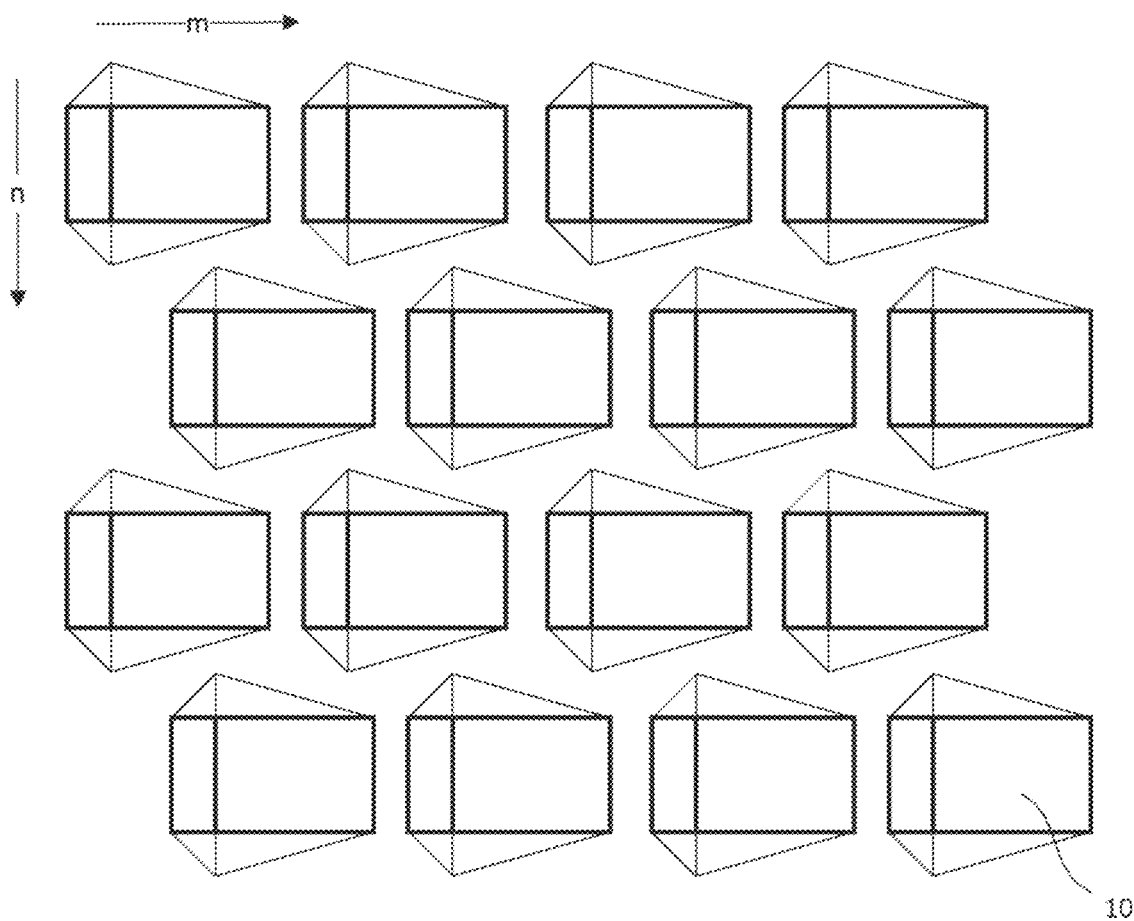
FIG. 4B is a schematic plan view of a MER array comprised of asymmetric MERs shown in a staggered array in accordance with one embodiment of the invention.

FIG. 4B shows an array of asymmetric MERs in a staggered or offset orientation whereas FIG. 4A shows an array of symmetrical MERs where the edges of adjacent MERs are aligned.

Figure 5A:
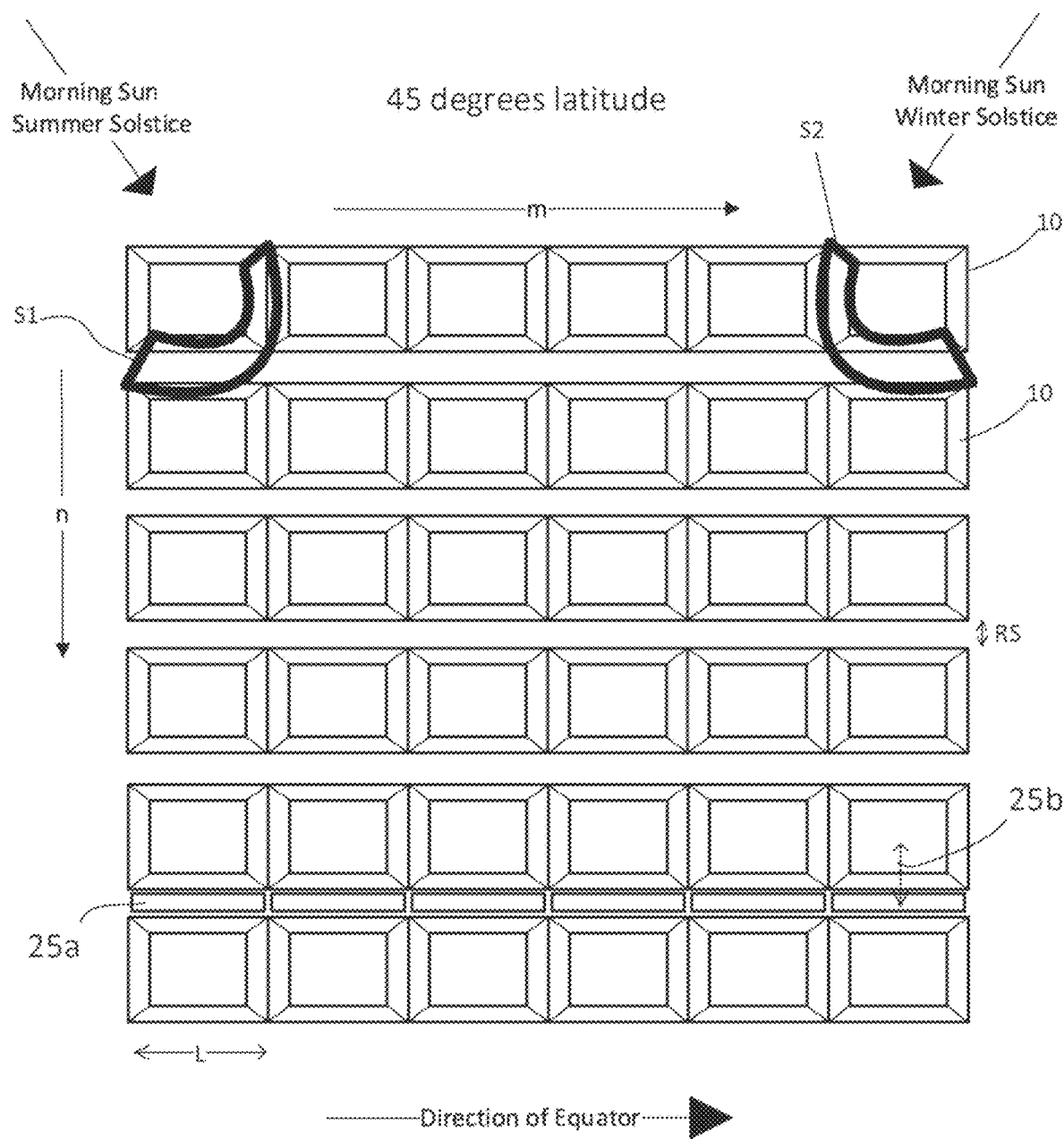
FIG. 5A is a schematic plan view of a MER array comprised of symmetrical MERs showing representative morning shadow characteristics at different times of the year as well as inter-MER panels in accordance with various embodiments of the invention.

FIG. 5A shows an array (m by n) of individual MERs 10 arranged in parallel rows. In this particular deployment, each row of MERs is arranged in a pole-equator direction; however, it is understood that the orientation could be east-west. As shown, the rows are spaced apart by a row spacing (RS) which is sufficiently wide to allow technicians to move between the rows for servicing and/or maintenance. As shown, the RS may be provided with additional inter-row solar panels (IRSP) 25a that can be extended within the rows in order to provide a further increase in solar cell density for a given land area. If so configured, the additional IRSPs 25a may be provided with a drawer mechanism to allow the IRSPs 25a to slide beneath a MER as shown by arrow 25b (See also FIG. 5A(1)) or by a hinge mechanism 25c to enable a technician to pivot the IRSP up to gain access to a row (See also FIG. 5A(2)).

FIG. 5A also shows representative shadows that may be cast by each MER depending on the time of year and time of day. As shown, during the summer months, in the early morning (e.g. within about 1 hour of sunrise), S1 is a representative shadow for 1 MER. Importantly, even with a low sun, the shadow does not extend over the upper surface of the adjacent MER. Similarly, S2 shows a representative shadow for early morning at the winter solstice.

Figure 5B:
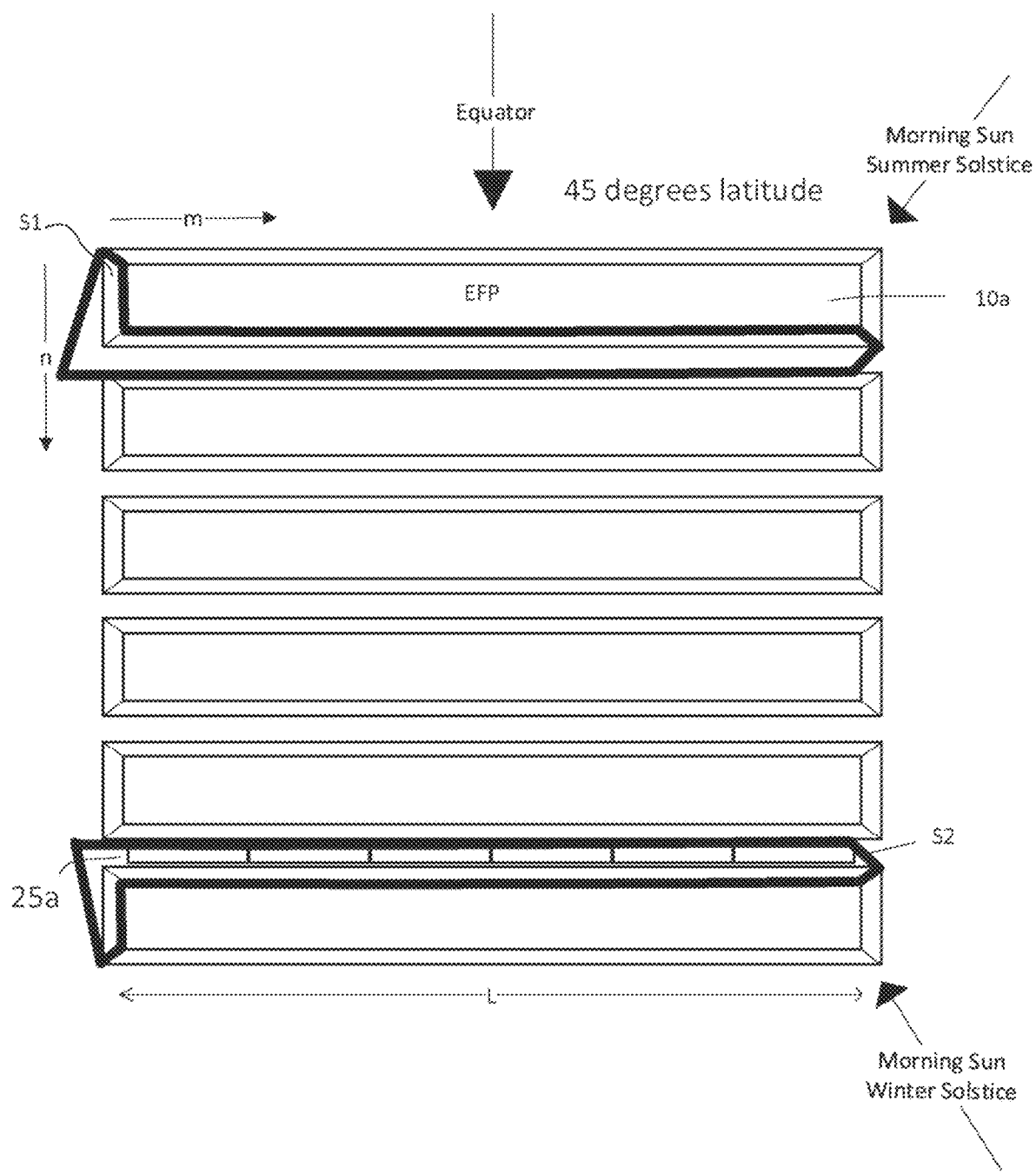
FIG. 5B is a schematic plan view of a MER array comprised of elongated MERs showing representative morning shadow characteristics at different times of the year as well as inter-MER panels in accordance with various embodiments of the invention.

FIG. 5B shows a plurality of elongated MERs arranged in rows (n rows). Elongated MERs have a longer length L and thus reduce the number of side panels as compared to the smaller MERs as shown in FIG. 5A. In this example deployment, the MERs are arranged in an east-west orientation. Again, the representative shadows S1 and S2 in the early morning are generally not cast onto the upper EFP panels of an adjacent MER.

The choice of whether to deploy smaller MERs or elongated MERs will depend on a number of factors relevant to a particular installation and may include the relative permanence of an installation. Generally, smaller MERs may be more suitable for semi-permanent installations and/or terrain having features that may prevent the ready deployment of longer MERs.

Side Panel Design

Preferably, as noted, MERs will include side panels to a) increase the total surface area of panels, b) to provide improved structural strength to the MER and c) to improve stability of a MER under wind-loading. Generally, as with the embodiment described with respect to FIGS. 1A and 2A, each side will preferably include 1 or more side panels that extend from the EFP and PFP outwardly a distance x which preferably is equal for each of the PFP and side panels. Generally side panels will have slopes in the range of about 45 degrees to the vertical (range 30-60 degrees). As understood, it is generally not desired to have vertical PFP or side panels so as to reduce wind loading forces and position these panels at an angle that improves power capture efficiencies for a greater period of time each day and throughout the year as discussed above.

Figure 6A:
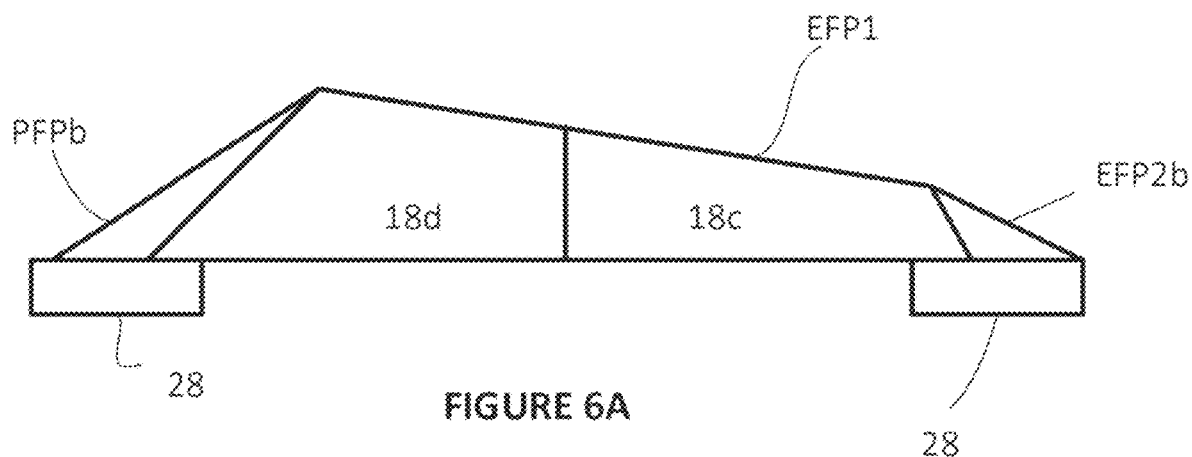
FIGS. 6A and 6B are a schematic side view and plan view respectively of a multi-faceted MER in accordance with one embodiment of the invention.
Figure 6B:
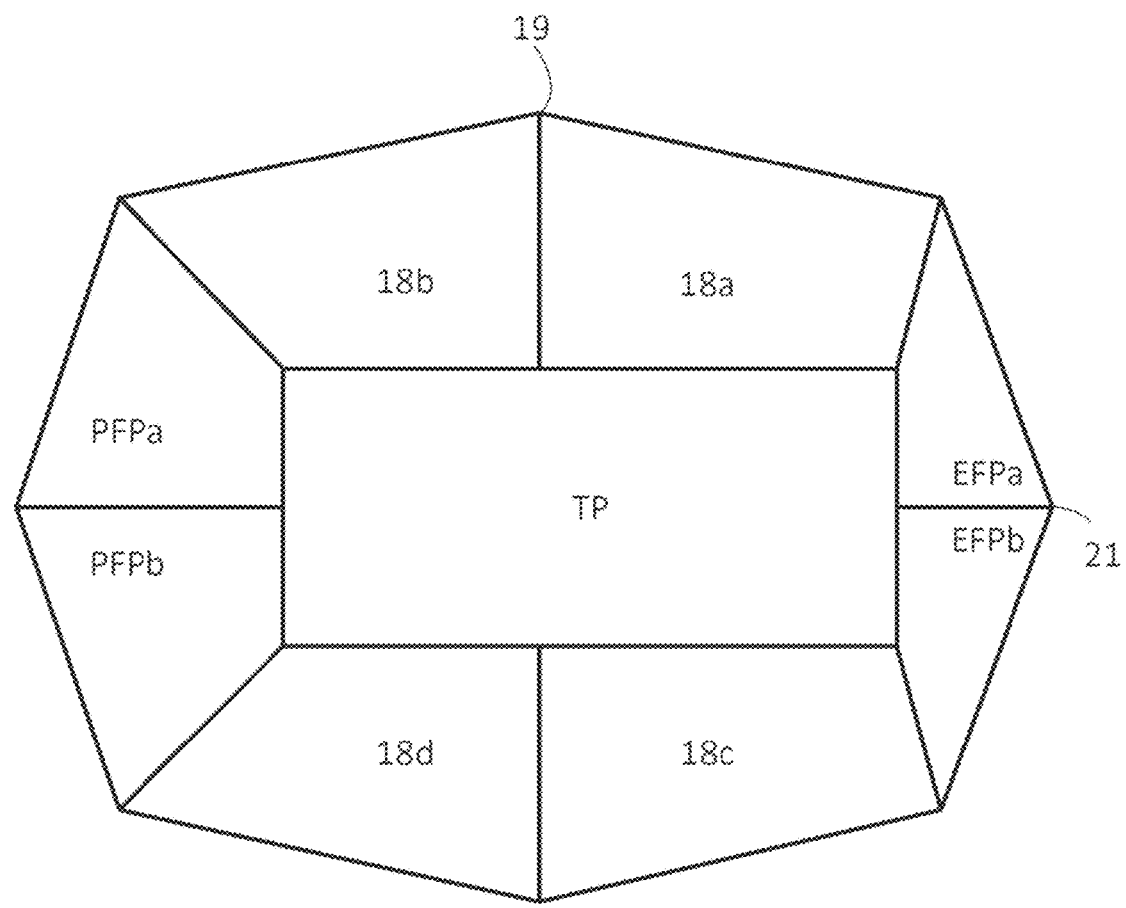
Figure 6C:
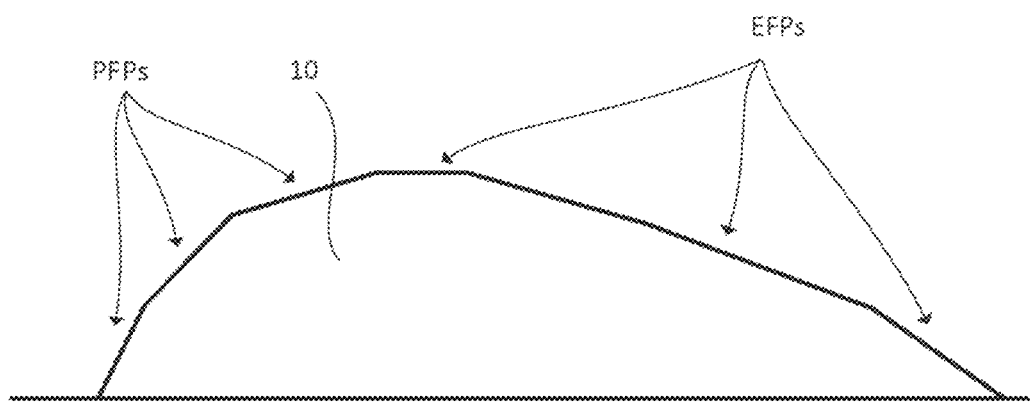
FIG. 6C is a schematic side view of a multi-faceted MER having multiple PFPs and EFPs in accordance with one embodiment of the invention.

Further embodiments may also have additional panels as shown in FIGS. 6A and 6B. For example, side panels (e.g. 18a, 18b) may include one or more vertexes 19 that effectively section a simple side panel into multiple sections. Similarly, a single PFP or EFP panel may be partitioned into two panels EFP1a and EFP1b and/or PFPa and PFPb. Generally, to the extent that individual solar panel are flat, there is a practical upper limit to the number of surfaces. However, the invention contemplates the assembly of solar cells into a wide array of 3-dimensional multi-faceted domed surfaces as shown in FIG. 6C. Further still, flexible solar panels may be configured to a support frame to provide substantially continuous curves.

Other Design Features

MERs may be integrated within a smaller single residential system or larger scale industrial roof top and array installations. In various embodiments, MERs may be configured into an elongated structure as described above.

For example, a 2120 Watt symmetrical MER was built having a) two top panels consisting of 70 individual cells (6 inch by 6 inch), 265 Watts capacity each, measuring 37 inches wide and 66 inches long and b) four trapezoid PFP, EFP and SPs constituting the sides of the MER unit providing base exterior dimensions of 11.5 ft by 11.5 ft and a height of the top panel of 30 inches. In various embodiments, a height range of between 18 inches to 48 inches is preferred depending on the latitude and/or particulars of the deployment site.

The optimum height range changes the closer to the equator these systems are installed typically having a taller height closer to the equator.

As is understood, larger MERs may be built having greater base areas (square or rectangular and other shapes). For example, an elongated MER having an approximate 10,000-20,000 Watt power rating comprised of 32-64 320 Watt panels is a practical size for larger field deployments. MER deployments of this size could provide output in the range of a 600,000 Watt system on a one acre land site as described below.

PV Cells and Panels

Photovoltaic panels output and efficiency continues to improve with the use of new materials and technologies such as passivated emitter and rear cell (monoperc) now developed within newer panels (Quantum 2018). Additional new panel sizes or configurations can be incorporated into MER units or similar structures with higher Watt capacity as panel technologies improve. New panel models are improving year by year with expectations of up to 350 Watt performance per panel with similar panel dimensions in the near future (Sun Power 2018).

The PV cells can be monocrystalline, polycrystalline (or Multicrystalline), Amorphous, PV cells from 3d printers, three dimensional PV cells, and spray-on PV and generally, any material that converts radiant energy to electricity can be used. In certain embodiments, the number of individual cells within each panel may vary depending on the region in which these types of systems are installed. It is contemplated that systems that incorporate this approach will utilize larger panels with larger individual PV cell numbers in each panel the closer to the equator the system is.

Bi-facial panels may also be utilized as described below.

Air Gaps

In various locations and deployments, MERs may include ventilation systems to allow air circulation within and around a MER. That is, small separations may be provided between panels to enable air circulation and permit water and/or snow drainage. Other means of ventilation, such as holes, grills and other such air vents may be provided in different portions and different sides and bottom of the MER unit to thereby facilitate air into and out of beneath a series of MER units aligned in a row.

Wiring

Each MER will preferably be configured to incorporate electrical wiring, switching, and connecters for the transmission of the produced electricity and its conveyance to an electrical storage system or to local electric utility company grid. Electrical cables (not shown) may be run along the length of the MER within a side trough that connect MER units aligned in a row, to additional electrical components, such as inverters, regulators, battery collection system and the like.

Reflectors

In certain embodiments, pole side panels may be provided with reflector units 25 that can be effective in reflecting light against the PFPs as shown in FIG. 3A. Reflector units would typically be utilized on a row of MER units closest to the pole.

Reflectance and Inter-Panel Spacing

The light cell reflectance value is one parameter that is taken into account in the design of the solar generator system. The inter-relation of the light cell reflectance value with other parameters of the solar generator system determines the performance characteristics of the system. Other parameters of interest are the inter-panel spacing—that is, the distance between the active-side reflector and the passive-side reflector of the cell—and the height and other dimensions of each cell.

Foundation

Generally, as individual panels/MERs have a solid frame and base, attachment to a foundation system will be simpler than conventional arrays. Wind loading with low profile MERs will not require deep foundations to support wind loading forces as compared to taller systems in many installations. As such, simple perimeter weighting systems (FIG. 6A, 28) may be sufficient for certain installations.

OTHER EMBODIMENTS

Figure 7:
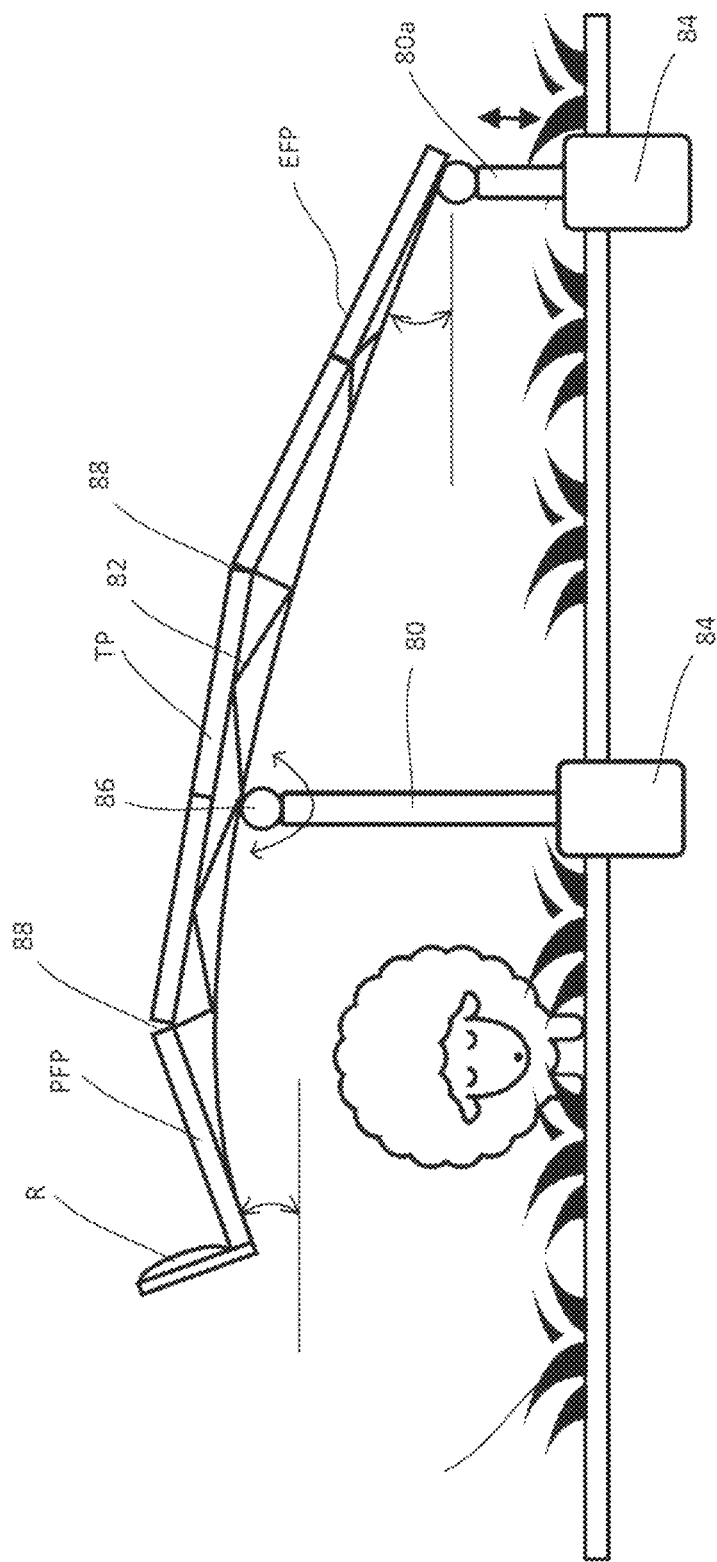
FIG. 7 is a schematic side view of an elevated MER in accordance with one embodiment of the invention.
Figure 7A:
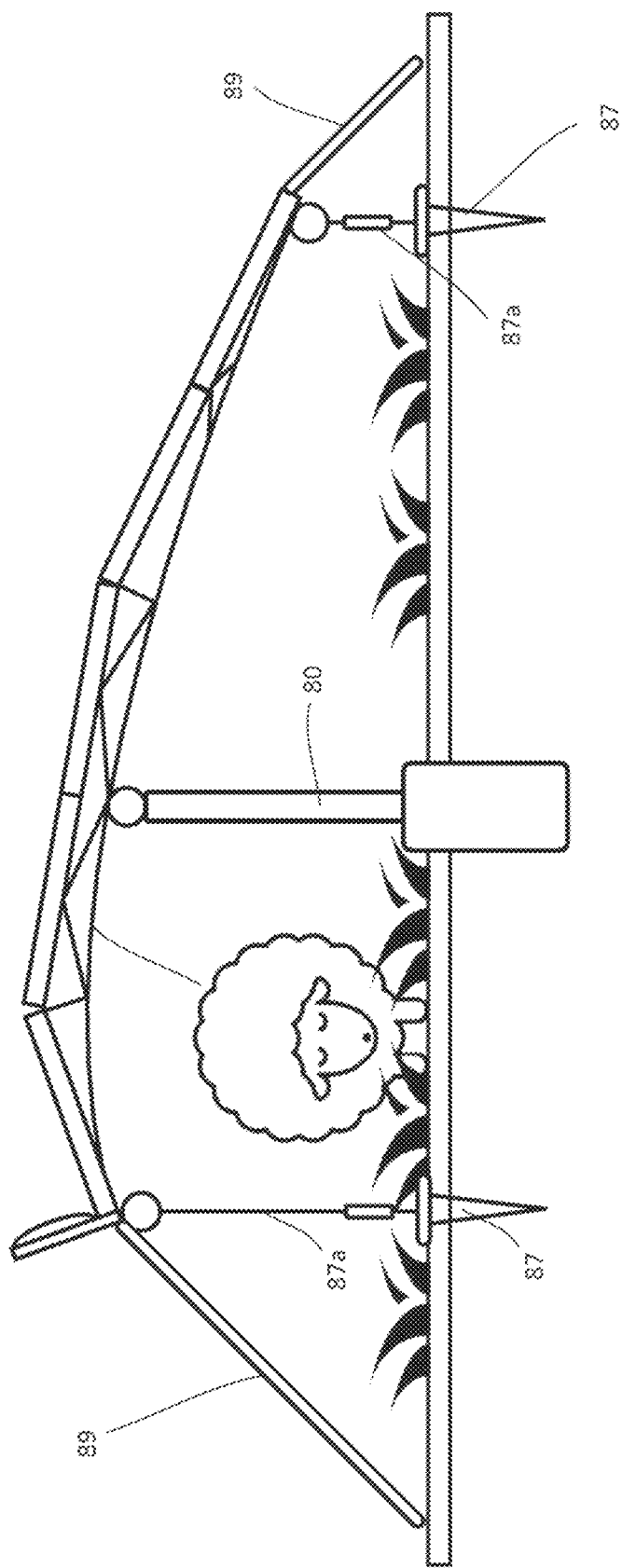
FIG. 7A is a schematic side view of an elevated MER with ground screws and wind panels in accordance with various embodiments of the invention.
Figure 7B:
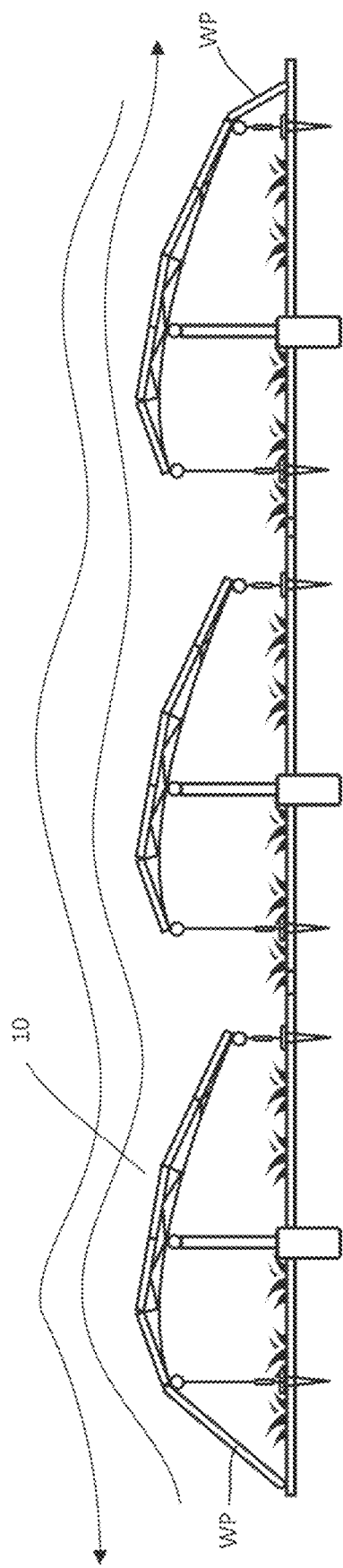
FIG. 7B is a schematic side view of three rows of an elevated MER array with ground screws and wind deflection panels in accordance with various embodiments of the invention.
Figure 7C:
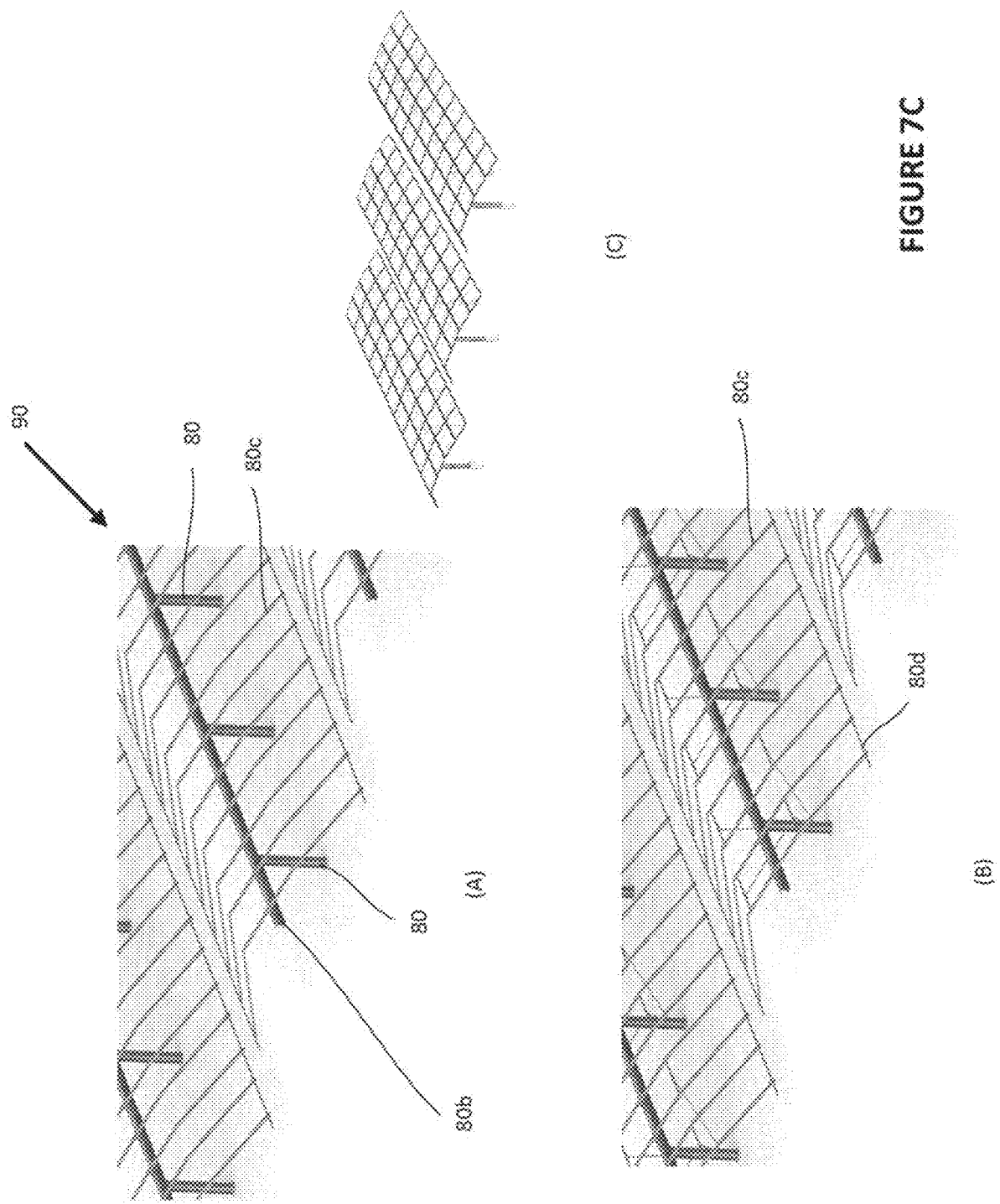
FIG. 7C(A-C) are perspective views of a frame support system (A/B) in accordance with various embodiments, and with integrated solar panels (FIG. 8C(C)).
Figure 7D:
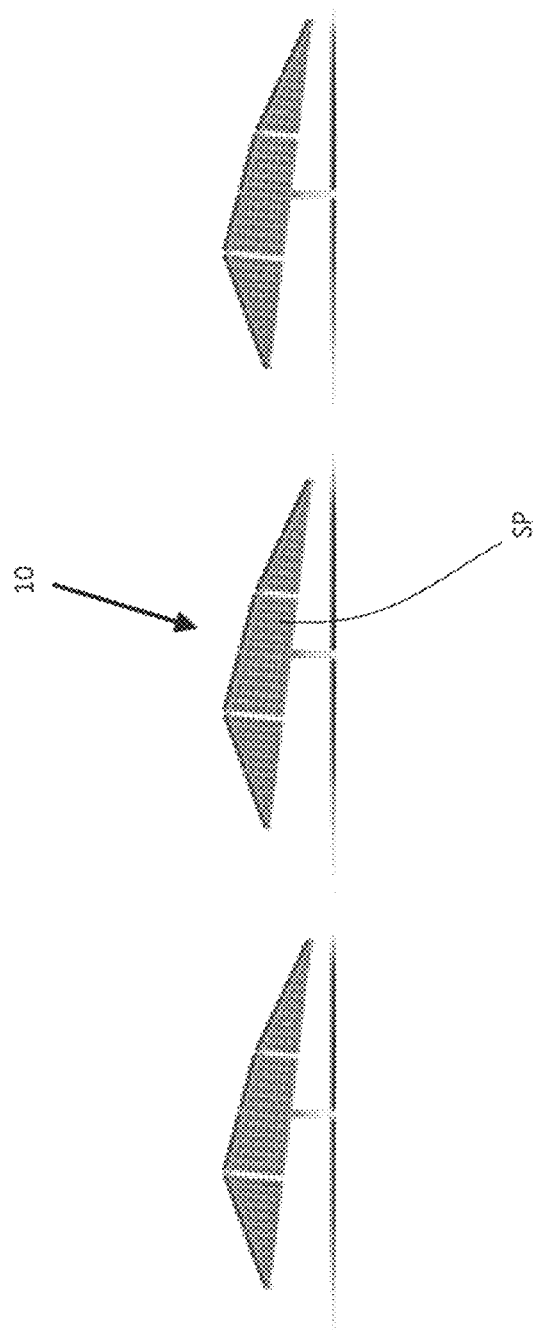
FIG. 7D is a side view of 3 rows of an elevated MER array in accordance with one embodiment of the invention.
Figure 7E:
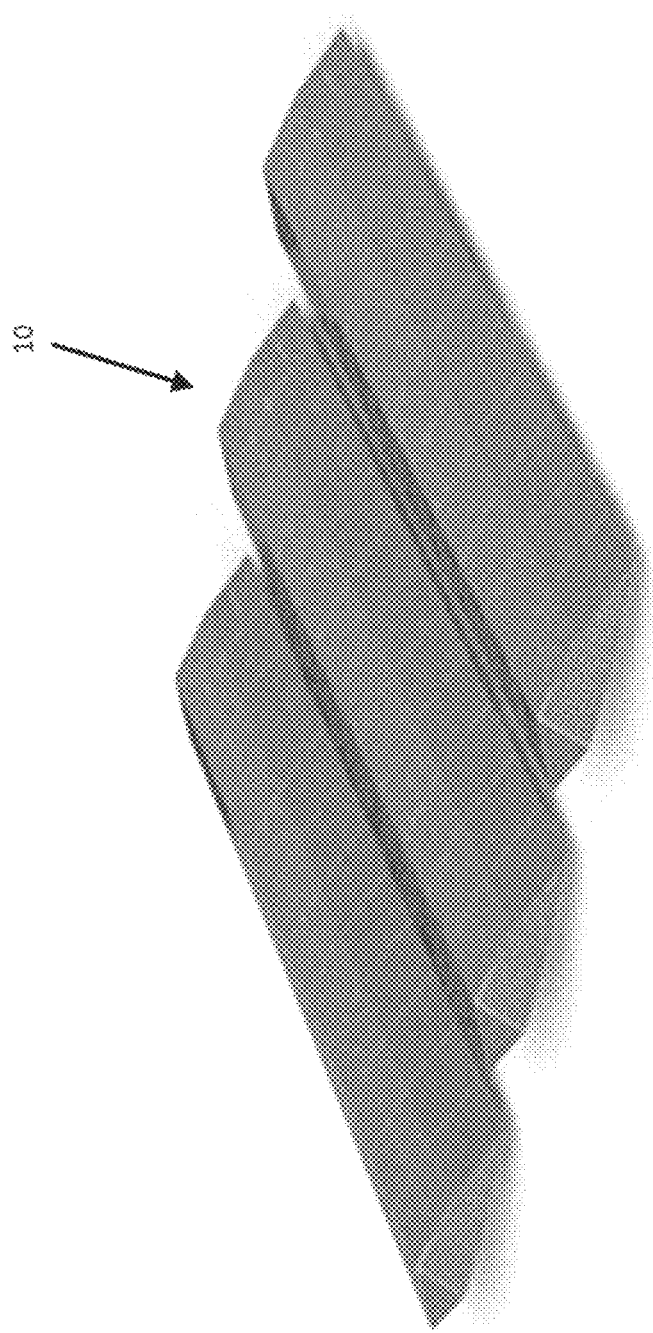
FIGS. 7E and 7F are perspective views of 3 rows of an elevated MER array in accordance with various embodiments of the invention.
Figure 7F:
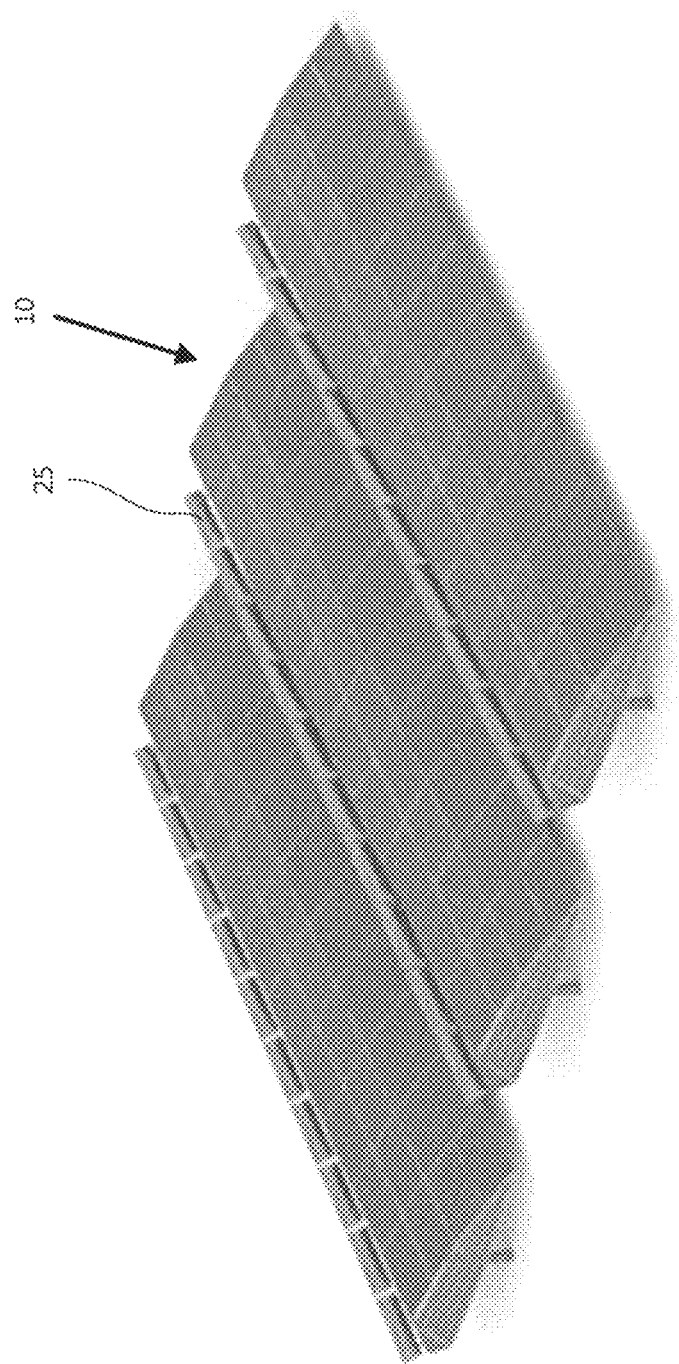

As shown in FIGS. 7-7F, further embodiments of the system are described. FIG. 7 shows an embodiment where a MER 10 is elevated above the ground on one or more supports 80, 80a. In this embodiment, the panels (EFP, TP and PFP) are mounted to a frame 82 and supported above the ground a short distance on foundations 84. In particular, the height of the MER is preferably within a range of about 4-6.5 feet to enable grazing animals such as sheep to walk beneath and between rows for allowing such animals to graze for weed control while also being tall enough to facilitate maintenance of such systems by humans, on the same land that is generating power.

In one embodiment, the main support 80 is positioned at roughly a central balance point 86 of the MER and second support 80a can be adjusted in height to pivot the system thus allowing technicians to adjust the angle of the system at installation but also to potentially adjust angles for different times of the year. As such, the second support 80a may be a linear actuator configured to a controller (not shown) that automates adjustment.

As shown, the system may also include a reflector R optimized to reflect additional light on to the PFP.

FIG. 7A shows a further embodiment where the MER 10 is supported on main support 80 and held at the desired angle by ground screws 88, cables 88a and cable adjusters 88b. In this embodiment, both cables may be placed in tension to firmly secure the MER array to the ground.

In another embodiment as shown in FIGS. 7A, 7A(1) and 7B, wind panels (WPs) 89 may be configured to outer edges of a MER to facilitate wind flow over and/or around an installation and to prevent substantial air flow underneath one or more MERs and/or to create downforce push the MERs to the ground. In the case of a single MER as shown in FIG. 7A, WPs may be on opposite sides of the MER or simply on opposite sides of an array of MERs as shown in FIG. 7B (with representative wind shown flowing in opposite directions).

WPs may be wind opaque, or semi-permeable to wind depending on the prevailing wind conditions at the installation.

In addition, WPs may also be a further array of solar panels that will further increase the power capacity of the installation.

FIG. 7A(1) shows an example of a MER constructed from bi-facial solar panels 89a. In this embodiment, as bi-facial solar panels are semi-translucent, they allow some light through the panels. Depending on the deployment situation and the underlying ground surface, such light can partially reflect off the ground (eg. a sand surface) and be captured by a ground-facing side of a bi-facial solar panel thus increasing the overall power captured by the MER. In various embodiments, additional reflective surfaces 81, such as reflective/bubble foil insulation may be laid along the ground to increase ground surface reflectivity.

Support Frame

As shown in FIGS. 7C, 7D and 7E, various frame support structures 90 are described. A central member 80b is supported on a plurality of support columns 80 and that collectively support the weight of the MER array. Panel support members 80a generally support and allow connection of the outer edges of the solar panels to the frame and may include appropriate cross members 80d. The design of each support member will be determined having consideration to various facility factors including the desired height of the MER array above the ground (if any), wind factors and the weight of the solar panels. As shown in FIG. 7, the support members may be trusses 82.

FIGS. 7D and 7E show a perspective view of three MER arrays 10 having side panels and additional PFP reflectors 25 (FIG. 7E). In various embodiments, small gaps 88 (FIG. 7) (up to about 1 inch) are maintained between panels to facilitate air flow and water drainage.

Advantages

Figure 9:
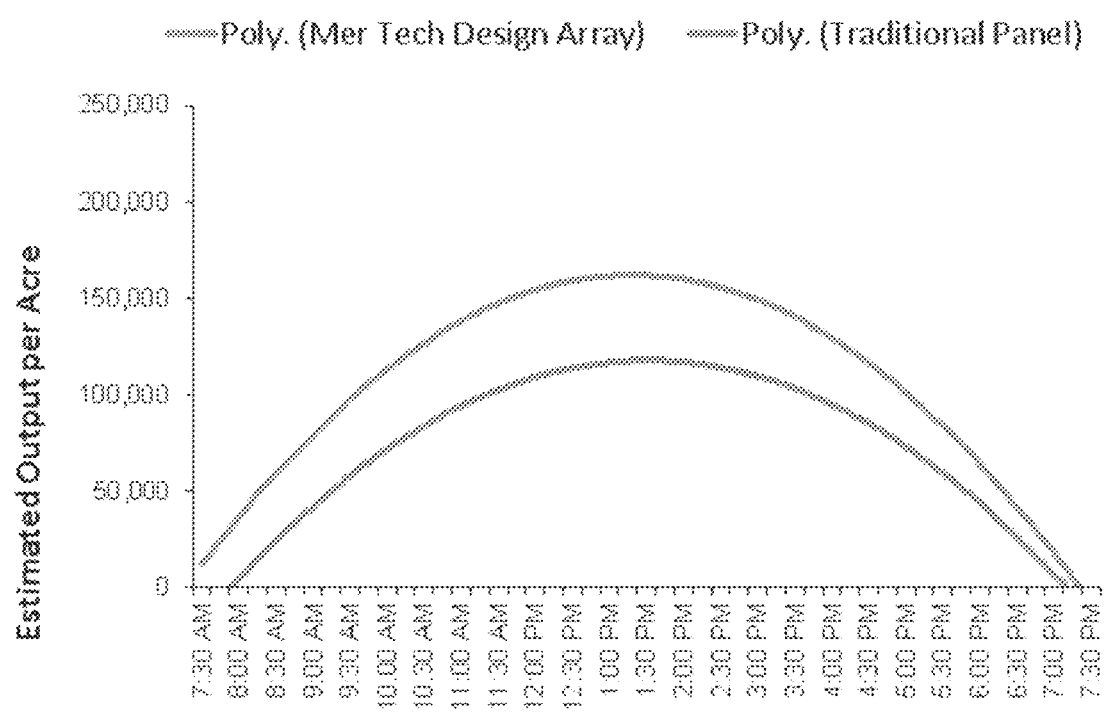
FIG. 9 is a graph showing a representative difference in power output from a fixed panel array and a MER array on a one acre field over the course of a typical day, based on a design criteria of lowest shadow impact of December 21 winter solstice.

The three-dimensional solar electric generator system described herein provides several advantages. These include reduced land footprint size, because by placing panels within a series of low-profile MER units at specific range of angles, the capacity of panels housed within an actual footprint can be increased materially versus traditional panel array systems. They also include better extension of the solar day, especially in summer months in latitudes farther north or south of the equator. Incorporating panels on four sides enables all panels to become active power contributors at specific times of the day. Peak hour requirements will facilitate a more balanced power distribution curve over an extended period of the day as shown in FIG. 9 for a representative installation comparing power output of a MER array vs. a traditional flat-panel array.

Another advantage is that less construction and installation may be required as foundations may be smaller and/or not required.

Furthermore, in the case of installations that elevate the array, the system can enable multiple uses of land where underlying vegetation can still grow beneath the arrays that allows animal grazing and human maintenance beneath the arrays.

Examples

FIGS. 8A-8F provide a qualitative and quantitative comparison of output of different MER arrays in comparison to a traditional array when deployed on a given land area.

MER Model 1

For the purposes of illustration, an elongated MER may be assembled from a number of standardized solar panels that form a MER structure as shown in FIG. 3A. In this example, individual solar cells 90 (each 6 inch by 6 inch) are assembled with an appropriate backing and frames (not shown) as solar cell panels 92. As such, a 14 by 7 array of solar cells 90 will have dimensions of about 42" (3.5 feet) by 84" (7 feet). Each panel 92 is then assembled into a basic MER unit utilizing one panel as a PFP, two panels as top panels (TPs) and 1 panel as an EFP (FIG. 7A). The PFP is angled approximately 25-30 degrees with respect to the horizontal and the EFP is angled approximately 20-25 degrees to the horizontal. The two TPs are thus sloping slightly towards the equator at an angle of about 6-10 degrees when connected to the upper edges of each of EFP and PFP. The height H of the MER would be approximately 2 feet. A number of basic MER units are then connected together to form a single MER row as shown in FIG. 8B with approximate dimensions. Side panels may also be added also having an angle of approximately 25 degrees to the horizontal.

As shown in FIG. 8B, when assembled, the width W of each MER is approximately 13 feet.

Figure 8A:
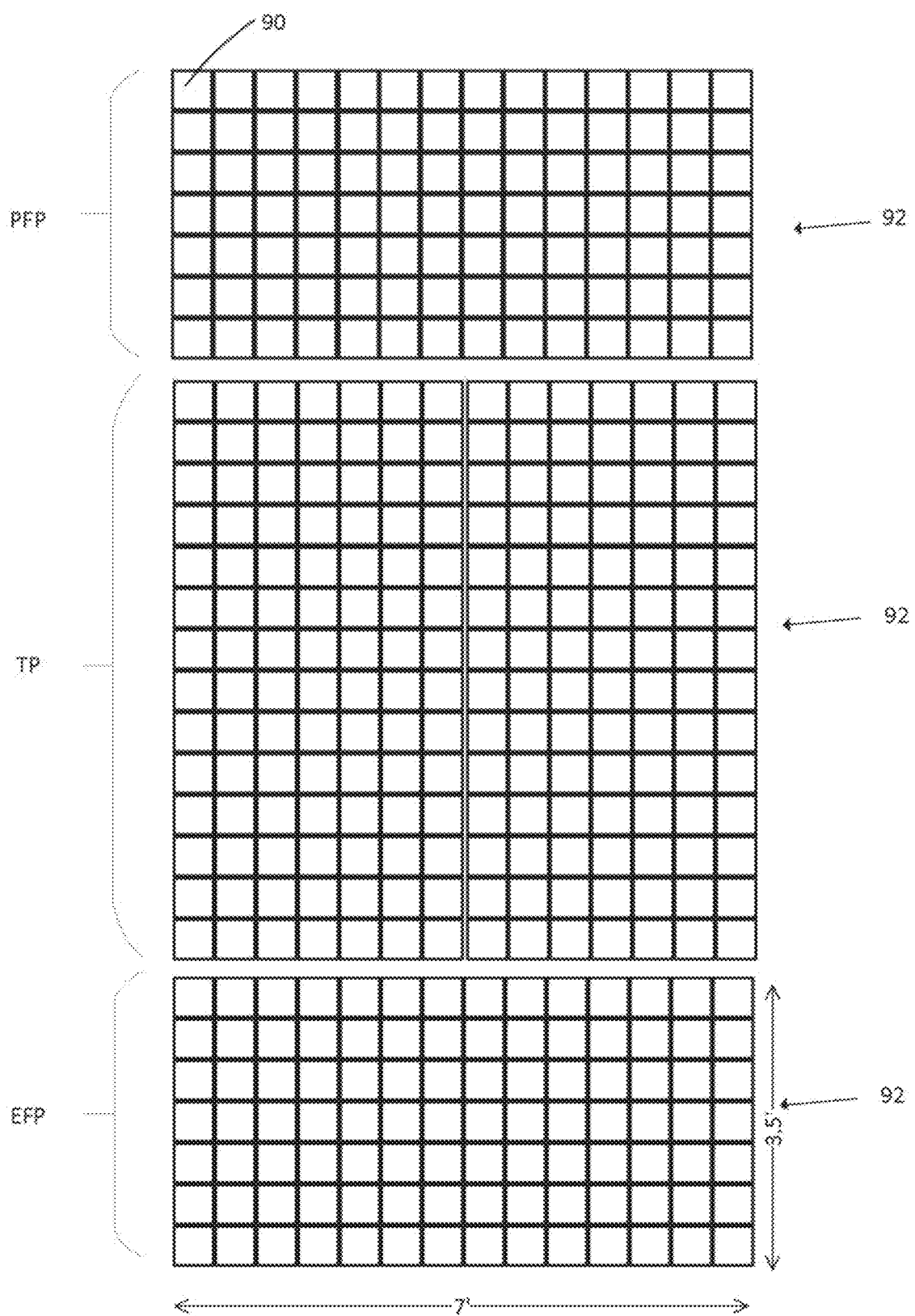
FIGS. 8A and 8B are schematic plan views of individual panels to assemble a MER (8A) and representative dimensions of a deployment (8B) in accordance with one embodiment of the invention.
Figure 8B:
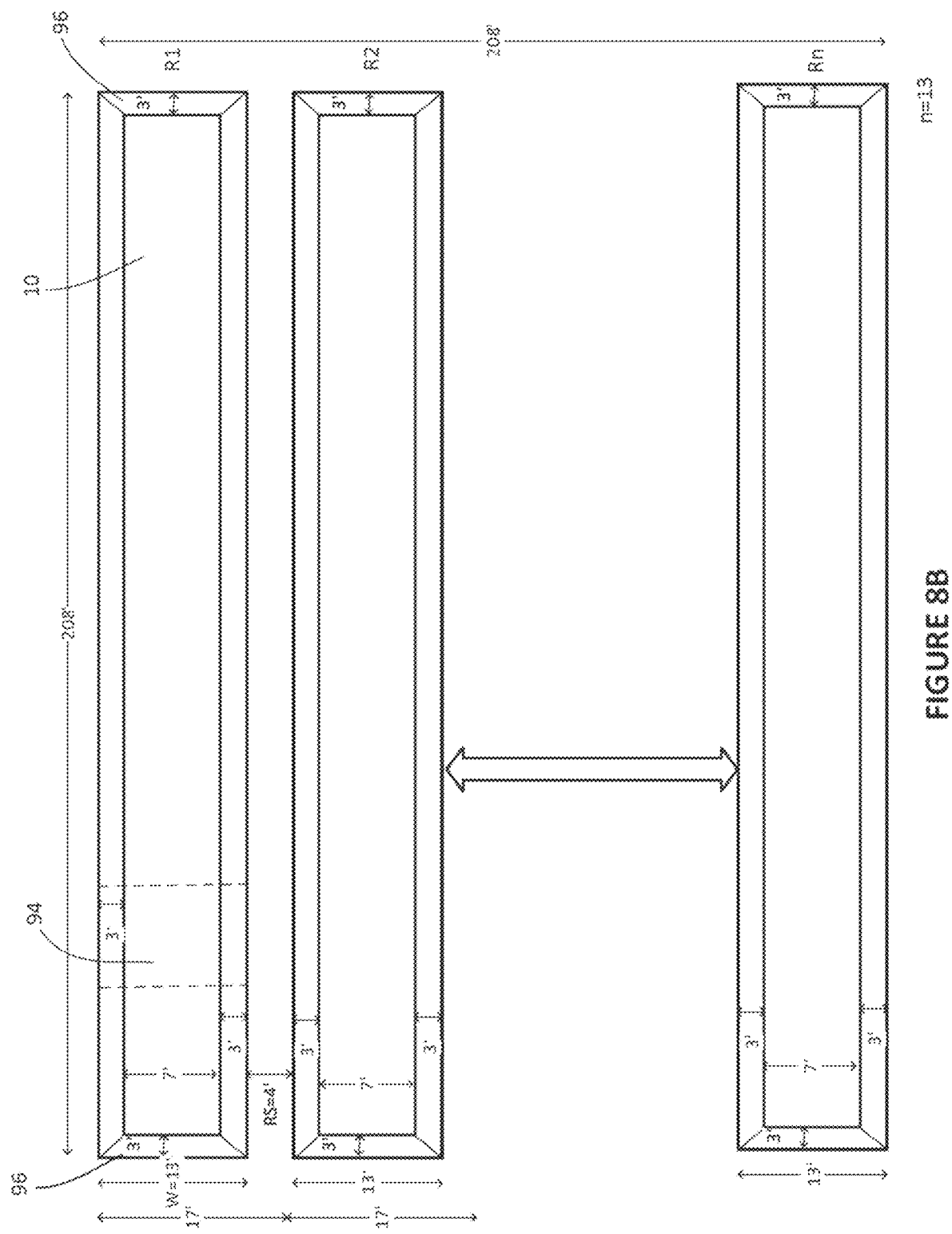

For deployment on an acre of land (208 feet by 208 feet for illustration), the panels as shown in FIG. 8A are connected side-by-side to form an elongated MER having dimensions as shown in FIG. 8B. With a row spacing of approximately 4 feet, 12 rows of MERs can be laid out on 1 acre of land with 11 space rows. With a row spacing of approximately 3 feet, 13 rows of MERs could be laid out with 12 space rows.

Accordingly, and accommodating for the slope of the side panels, the EFP and PFP will each comprise 29 panels, the side panels will each comprise 2.5 panels and the TP will comprise 58 panels.

MER Model 2

Figure 1C:
Figure 8C:
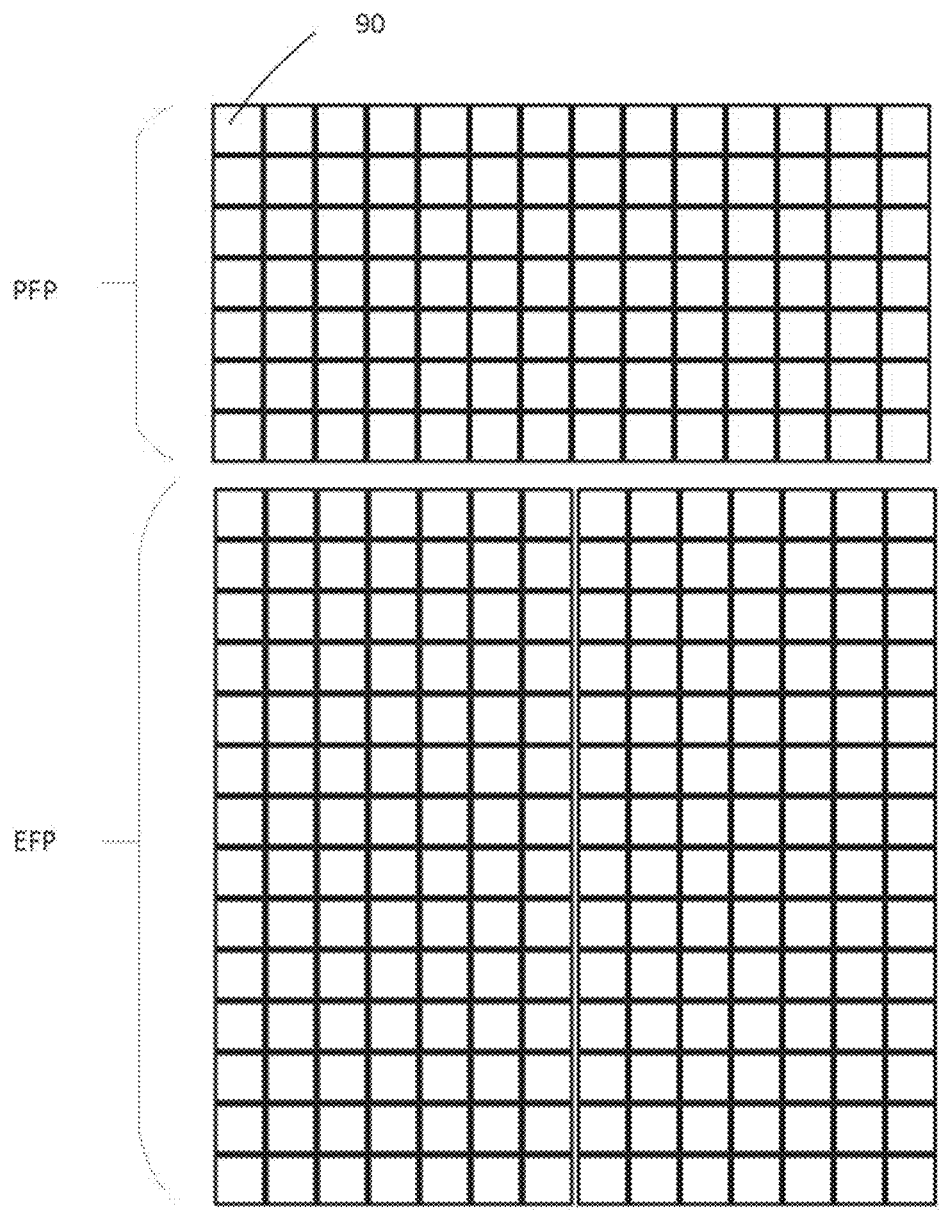
FIGS. 8C and 8D are a schematic plan view of individual panels to assemble a MER (8C) and representative dimensions of a deployment (8D) in accordance with one embodiment of the invention.
Figure 8D:
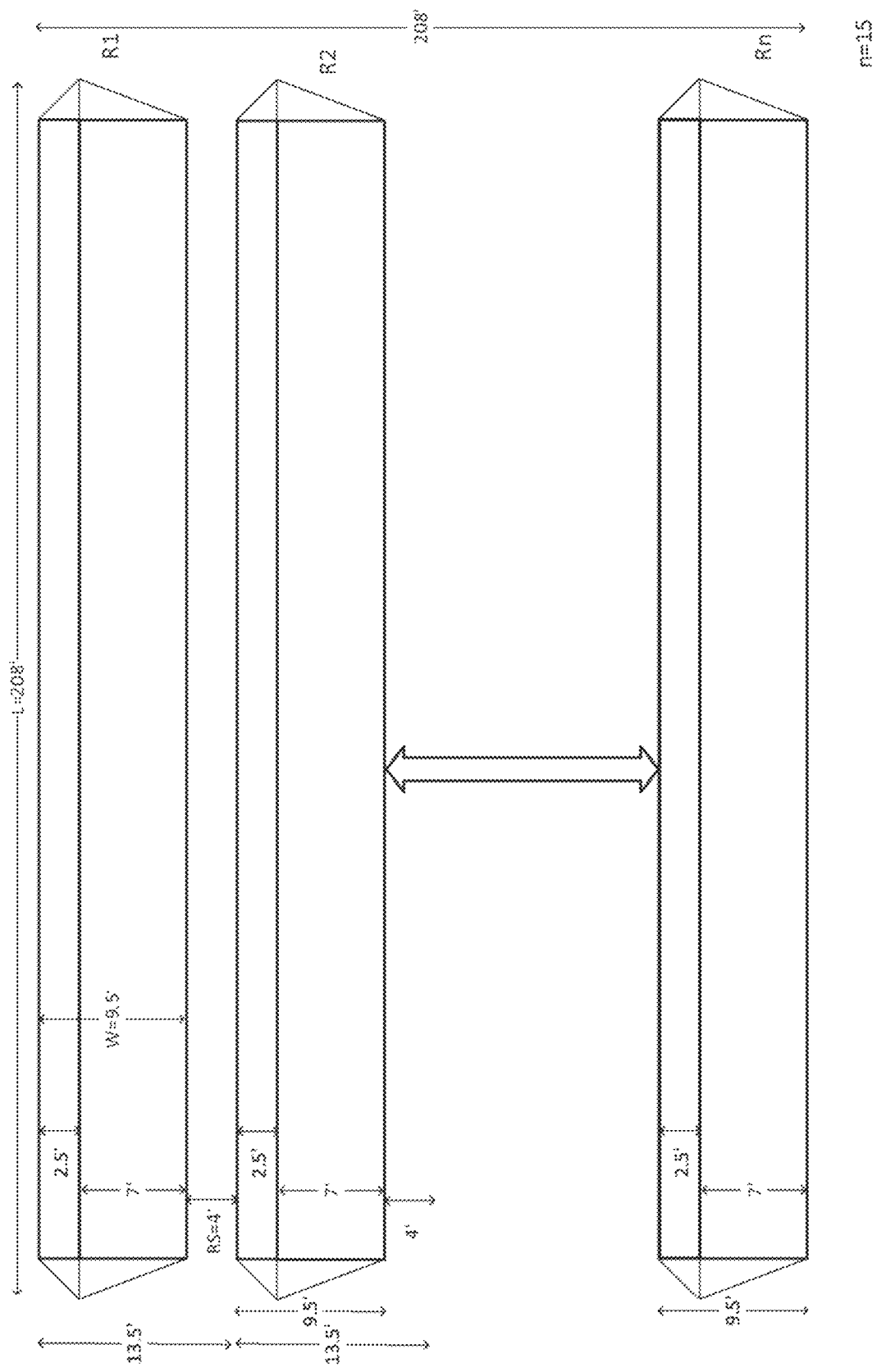

FIG. 8C shows a simpler MER model with a single PFP and an EFP tilted to the equator with typical angles as per FIG. 1. In this case, the height h would be approximately 2 feet. FIG. 8D shows a MER width of 9.5 feet and a RS of 4 feet. Thus, in this example, 15 rows of MERs (with 14 space rows) can be laid out on a square acre of land. With a row spacing of 3 feet, 17 rows of MERs (with 16 space rows) can be laid out on a square acre of land.

MER Model 3

FIG. 7D show a six panel MER model with two PFP and two top EFP and two south EFP tilted to the equator with angles of 25 degrees for the south EFP, 15 degrees for top EFP panels, and 20 degrees for PFP panels. In this case, the height h would be approximately 4.5 feet. FIG. 7D shows a MER width of about 19 feet and a RS of 6 feet. Thus, in this example, 8 rows of MERs (with 7 space rows) can be laid out on a square acre of land. With a row spacing of 4 feet, 9 rows of MERs (with 8 space rows) can be laid out on a square acre of land.

Traditional Array

Figure 8E:
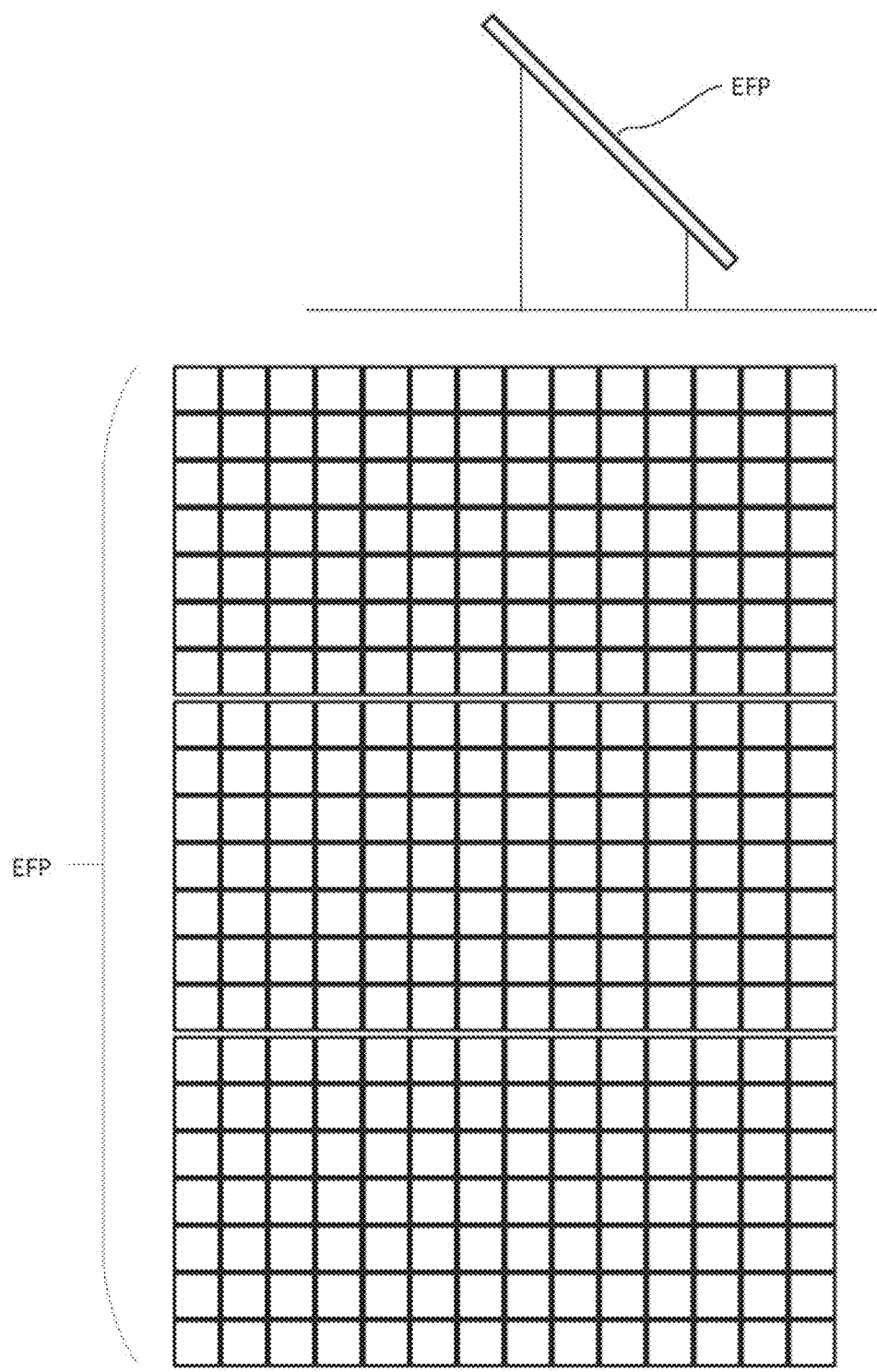
FIGS. 8E and 8F are a schematic plan view of individual panels to assemble a traditional solar array (8E) and representative dimensions of a deployment (8D) in accordance with the prior art.
Figure 8F:
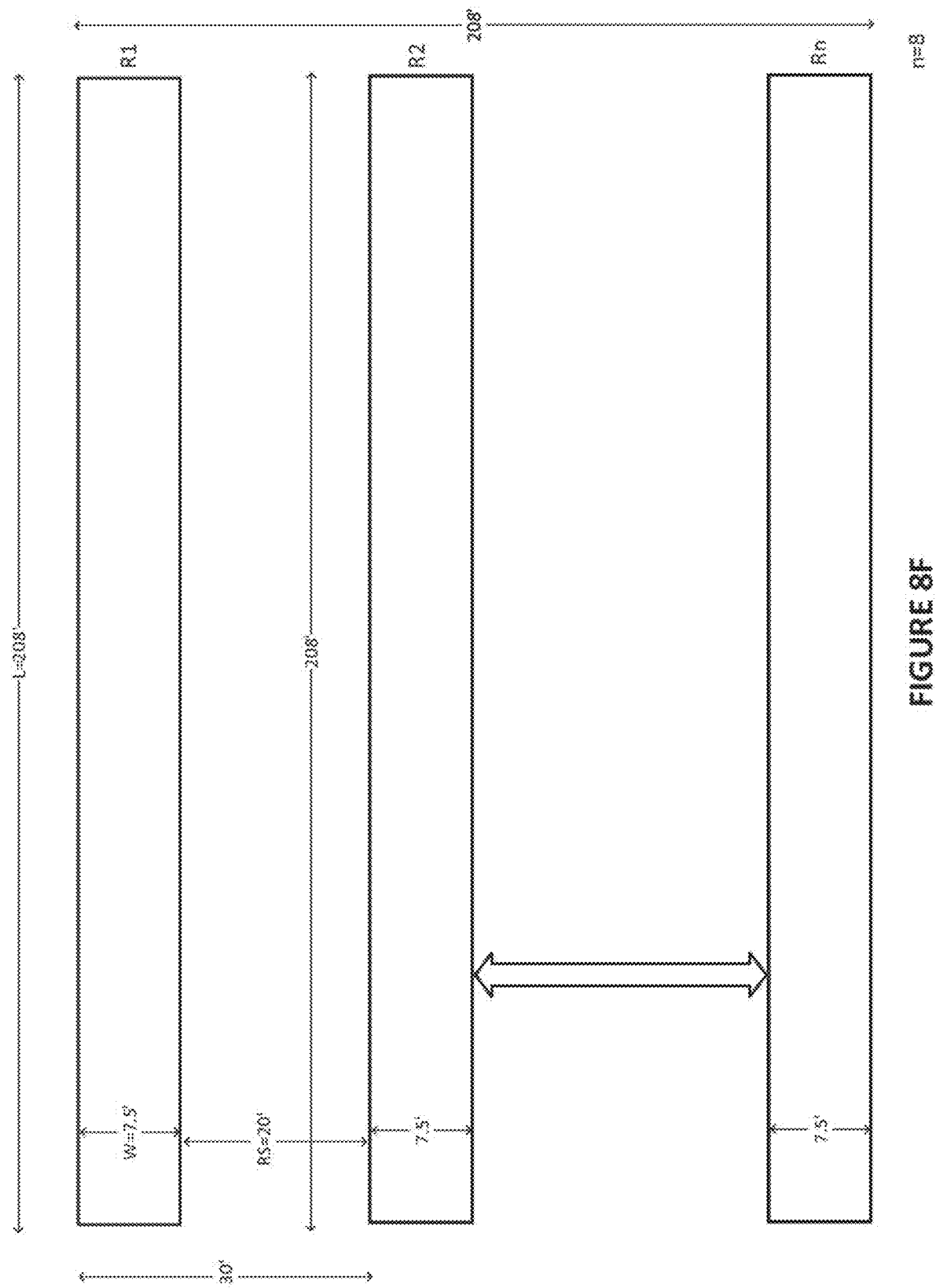

For comparison, a traditional array is shown in FIGS. 8E and 8F. A traditional array may be comprised of 3 EFPs aligned to form a basic assembled panel having a width of 10.5 feet. A basic panel may be assembled to form a panel row and at 45 degrees latitude would be fixed at an angle of 45 degrees to the horizontal. As such, the plan view width W of each row would be 7.5 feet and the side view height would also be at least 7.5 feet (discounting any additional height for foundation structures). Accordingly, in order to reduce shadow effects between adjacent rows, given the height of each row, the typical spacing would be in the range of 20 feet allowing 8 rows of panels and 7 space rows.

Based on the foregoing, a comparison of the power output of each of the MER models 1 and 2 and traditional array is shown in Table 2.

TABLE 2

Comparison of Power Output for MER Models 1 and 2 and a Traditional Array on a Square Acre of Land

| Panel | Cells/Panel | Number of Panels | Total Cells | Average Power/Cell (W) | Total Power (W) |
|---|---|---|---|---|---|
| MER Model 1 | | | | | |
| EFP | 98 | 29 | 2842 | 6 | 17,052 |
| PFP | 98 | 29 | 2842 | 1 | 2,842 |
| TP | 98 | 58 | 5684 | 6 | 34,104 |
| SPs | 98 | 2.5 | 245 | 1 | 245 |
| | | 2.5 | 245 | | 245 |
| Total W per row | | | | | 54,488 |
| 12 MER Rows | | | | Total Power/Acre | 653,856 |
| MER Model 2 | | | | | |
| PFP | 98 | 29 | 2842 | 1 | 2,842 |
| EFP | 98 | 58 | 5684 | 6 | 34,104 |
| SPs | 98 | 2 | 196 | 1 | 196 |
| | | 2 | 196 | 1 | 196 |
| Total W per row | | | | | 37,338 |
| 17 MER Rows | | | | Total Power/Acre | 634,746 |

TABLE 2-continued

Comparison of Power Output for MER Models 1 and 2 and a Traditional Array on a Square Acre of Land

| Panel | Cells/Panel | Number of Panels | Total Cells | Average Power/Cell (W) | Total Power (W) |
|---|---|---|---|---|---|
| Traditional Array | | | | | |
| EFP | 98 | 87 | 8526 | 6 | 51,144 |
| Total per Row | | | | | 51,144 |
| 8 Rows | | | | Total Power/Acre | 409,152 |

Accordingly, a MER array can show approximately a 50% increase in power density for a given land area as shown in Table 2 and FIG. 9.

Wind Study

A computational fluid dynamics (CFD) wind study was conducted for a multi-faceted MER having 2 EFPs angled at 25° to the horizontal, 2 TP's angled at 15° to the horizontal at the top surface of the EFPs and 2 PFPs angled at 20° to the horizontal connected to the TPs. This MER design was compared to a 6-panel (single angle fixed (SAF)) conventional array angled at 25° to the horizontal. For the CFD study, a 3 row MER array having 6 foot spacing was compared to a 3 row SAF array having 13 foot spacing. Both arrays have 72 panels per row (i.e. equivalent widths) and are assumed to be in an east-west orientation with the south side elevated 2 feet off the ground. Panels have a 2 inch gap between panels and a 100 mph (44.7 m/s) wind speed modelled.

Frontal Area

Table 3 shows the frontal and horizontal projected areas of the arrays as viewed from the north and top.

TABLE 3

Horizontal and Frontal Projected Areas

| | Frontal Projected Area (m$^2$) | Horizontal Projected Area (m$^2$) |
|---|---|---|
| 6-Panel SAF | 5.22 | 11.19 |
| 6-Panel MER | 2.81 | 11.58 |

The frontal area is 46% smaller in the MER Array and the horizontal projected area is only 3% larger in the MER Array.

Drag Force

The formula for drag force due to wind loading is:

$$F_D = C_D A \frac{\rho V^2}{2} \quad (1)$$

where $F_d$ is the Force Due to Drag (N), $C_D$ is the Coefficient of Drag, A is the Frontal Projected Area (m$^2$), p is the density of air (p=1.225 kg/m$^3$) and V is the average velocity of the air (V=44.704 m/s).

Since the average Wind Velocity and Density of the air are consistent between the scenarios tested, the Force due to Drag is proportional to the Coefficient of Drag and Frontal projected area as per equation (2) below $$F_D \propto C_D A \quad (2)$$

The coefficient of drag was calculated using a SimScale CDF analysis of the array under northward and southward wind loads. The coefficients of drag are shown in Table 4 Below.

TABLE 4

Coefficient of Drag results calculated from SimScale Results.

|  | Northward Wind | Southward Wind |
| --- | --- | --- |
| 6-Panel SAF | 0.84 | 1.39 |
| 6-Panel MER | 0.83 | 1.06 |

The Coefficient of Drag for the MER array with northward wind is only 2% smaller, and the coefficient of drag for the MER array under southward wind is 24% Lower.

From equation (2) determine that the drag force from northward and southward winds will be 47% Lower and 59% lower Respectively.

Lift Force

The formula for lift force due to wind loading is:

$$F_L = C_L A \frac{pV^2}{2} \quad (3)$$

where $F_L$ is the Force Due to Lift (N), $C_L$ is the coefficient of lift, A is the horizontal projected area (m$^2$), p is the density of air (p=1.225 kg/m$^3$) and V is the average velocity of the air (V=44.704 m/s)

Since the average wind velocity and density of the air are consistent between all of the scenarios tested, the force due to lift is proportional to the coefficient of lift and horizontal projected area. This is shown in equation (4):

$$F_L \propto C \, C_L A \quad (4)$$

The coefficient of lift was calculated using a SimScale CDF analysis of the array under northward and southward wind loads. The coefficients of lift are shown in table 5.

TABLE 5

Coefficient of Lift results calculated from SimScale Results

|  | Northward Wind | Southward Wind |
| --- | --- | --- |
| 6-Panel SAF | 0.83 | 1.35 |
| 6-Panel MER | 0.37 | 0.77 |

The coefficient of lift for a MER array with northward wind is 55% smaller. The coefficient of lift for the MER array under southward wind is 43% Lower.

From equation (4), the drag force from northward and southward winds is 53% lower and 41% lower respectively for the MER array.

CONCLUSIONS

The coefficients of drag and lift are lower in both the northward and southward wind directions. The lower coefficients show lower wind load forces then comparable single angle solar arrays. Importantly, with lower wind load forces, support frames and foundations can be substantially lighter and/or use less materials that for a comparable SAF array which further contributes to cost reductions in deploying MER arrays as described herein.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

REFERENCES

1. The system of claim United States Patent Application Publication Pub. NO. 2 US 2014/0014161 A1 Kim et al. (43) Pub. Date: Jan. 16, 2014
2. United States Patent Application Publication (10) Pub. NO.: US 2014/0116495 A1 KIM et al. (43) Pub. Date: May 1, 2014 (54) BIFACIAL SOLAR CELL MODULE WITH (52) US. CI. BACKSIDE REFLECTOR
3. United States Patent Application Publication (10) Pub. No.: US 2012/0007434 A1 Perreault et al. (43) Pub. Date: Jan. 12, 2012 THREE-DIMENSIONAL PHOTOVOLTAIC APPARATUS AND METHOD
4. United States Design Patent (10) U.S. Pat. No. D664,916S Conger et al Date of patent: Aug. 7, 2012 SOLAR ARRAY U.S. Pat. No. 4,429,178
5. United States Patent Application Publication (10) Pub. NO.: US 2011/0180125 A1 Wichner et al (43) Pub. Date: Jul. 28, 2011 Solar Panel for receiving scattered light
6. United States (12) Patent Application Publication (10) Pub. No.: US 2014/0238483 A1 RAMPLEY et al. (43) Pub. Date: Aug. 28, 2014 (54) THREE-DIMENSIONAL SOLAR CELL HAVING INCREASED EFFICIENCY
7. United States 12) Patent Application Publication (10) Pub. No.: US 2012/0138120 A1 Fernandez et al (43) Pub. Date: Jun. 7, 2012 Dimensional Solar Cells and Panels
8. Europe Smart Flower Energy Patent No EP 2 834 576 B1 SWATEK, Alexander Et al 2013 A-7540 Güssing
9. U.S. Pat. No. 9,568,218B2 (12) (10) U.S. Pat. No. 9,568,218 B2 Hollabaugh (45) Date of patent: Feb. 14, 2017 (54) SOLAR ARRAY POWER OUTPUT U.S. Pat. No. 8,178,775 B2*May 2012 Taylor et al., 136,246 MAXIMIZATION THROUGH CORRECTED 2993.945. A 258. Sist al., 3:638. SUNTRACKING METHODS
10. United States patent Jordan (10) U.S. Pat. No. 9,790,065 B2 (45) Date of patent: Oct. 17, 2017, SOLAR ARRAY LIFTER AND METHOD (71) Applicant: Travis Jordan, Ronan, MT (US)
11. United States (12) Patent Application Publication (10) Pub. No.: US 2015/0331972 A1 McClure et al. US 20150331972A1 (43) Pub. Date: Nov. 19, 2015 SYSTEM ε METHODS FOR SOLAR PHOTOVOLTACARRAY ENGINEERING
12. United States patent Atchley et al. U.S. Pat. No. 9,548, 696B2 U.S. Pat. No. 9,548,696 B2 Jan. 17, 2017 EAST WEST PHOTOVOLTAC ARRAY WITH SPACED APART PHOTOVOLTAC MODULES FOR IMPROVED AERODYNAMIC EFFICIENCY Applicant: SolarCity Corporation, San Mateo

The invention claimed is:

1. An array of solar panel assemblies, the array comprising:
    a plurality of rows of solar panel assemblies having a row spacing with a width RS between each row,
    wherein each solar panel assembly has:
        a length axis L, and
        a plurality of rectangular solar panels having an assembled height h, the plurality of rectangular solar panels including at least two adjacent sub-assemblies of an equator facing panel (EFP), a top panel (TP) and a pole facing panel (PFP), wherein, within each adjacent assembly the EFP, TP and PFP are fixedly connected together and oriented with respect to a horizontal plane wherein each TP is between an EFP and PFP and connected to a top edge of an EFP and PFP, the top edge parallel to the length axis;

each PFP is angled with respect to the horizontal plane at an angle β;

each EFP is angled with respect to the horizontal plane at an angle θ;

each TP is angled with respect to the horizontal plane at an angle ε and wherein θ and ε are not equal;

each TP fixedly interconnects the EFP and PFP to form a fixed segmented and dome-shaped assembly; and each PFP and EFP each have respective lengths to support a TP at the angle ε, and an inter-row solar panel (IRSP) configured to a lower edge of the EFPs or PFPs of the solar panel assembly within space row and wherein each IRSP is configured or selective movement of the IRSP between a deployed and exposed position and an un-deployed position and to abut an adjacent EFP or PFP of another solar panel assembly of the array in the deployed position.

2. The array as in claim 1 where the IRSP is pivotally attached to the solar panel assembly and configured to pivot between the deployed and exposed position and the un-deployed position.

3. The array as in claim 1 where the IRSP is configured to the solar panel assembly with a drawer system configured to slide the IRSP between the deployed and exposed position where the IRSP extends outwardly from the solar panel assembly into the space row and the un-deployed position where the IRSP is beneath the solar panel assembly.

4. The array as in claim 1 wherein each PFP and EFP are substantively equal in area and each TP is substantively twice the area of a PFP or EFP.

5. The array of claim 1 further comprising four trapezoidal side panels and where each trapezoidal side panel has two side edges operatively connected to a corresponding side edge of an adjacent side panel.

6. The array of claim 1 wherein the array has height range from top to bottom of a PFP of 18 to 28 inches when the array is deployed between 45-60 degrees latitude.

7. The array of claim 1 wherein the array has a height range from top to bottom of PFPs of 24 to 36 inches when the array is deployed between 0-45 degrees latitude.

8. The array as in claim 1 where ε is 0-20°.

9. The array as in claim 1 where h is 1-3 feet.

10. The array as in claim 1 where θ is 10-45°.

11. The array as in claim 1 where θ is 10-30°.

12. The array as in claim 1 where β is 10-45°.

13. The array as in claim 1 where β is 30-45°.

14. The array as in claim 1 wherein each solar panel assembly has a width W defined as a cross-sectional and transverse width through the PFP, TP and EFP and the length L perpendicular to W is 1-20 times W.

15. An array of solar panel assemblies, the array comprising a plurality of rows of solar panel assemblies having a row spacing with a width RS between each row, wherein each solar panel assembly has a length axis L, where each solar panel assembly consists of:

a plurality of rectangular solar panels having an assembled height h, the plurality of rectangular solar panels including at least two adjacent assemblies of an equator facing panel (EFP), a top panel (TP) and a pole facing panel (PFP), wherein, within each adjacent assembly the EFP, TP and PFP are fixedly connected together and oriented with respect to a horizontal plane wherein each TP is between an EFP and PFP and connected to a top edge of an EFP and PFP, the top edge parallel to the length axis;

each PFP is angled with respect to the horizontal plane at an angle β;

each EFP is angled with respect to the horizontal plane at an angle θ;

each TP is angled with respect to the horizontal plane at an angle ε and wherein θ and ε are not equal;

each TP fixedly interconnects the EFP and PFP to form a fixed segmented and dome-shaped assembly; and each PFP and EFP each have respective lengths to support a TP at the angle ε.

16. The array as in claim 15 further comprising an inter-row solar panel (IRSP) configured to a lower edge of the EFPs or PFPs of the solar panel assembly within the space row and wherein each IRSP is configured for selective movement of the IRSP between a deployed and exposed position and an un-deployed position and to abut an adjacent EFP or PFP of another solar panel assembly of the array in the deployed position.

17. The array as in claim 16 where the IRSP is pivotally attached to the solar panel assembly and configured to pivot between the deployed and exposed position and the un-deployed position.

18. The array as in claim 16 where the IRSP is configured to the solar panel assembly with a drawer system configured to slide the IRSP between the deployed and exposed position where the IRSP extends outwardly from the solar panel assembly into the space row and the un-deployed position where the IRSP is beneath the solar panel assembly.

19. The array as in claim 15 wherein each PFP and EFP are substantively equal in area and each TP is substantively twice the area of a PFP or EFP.

* * * * *